(12) United States Patent
Ajima et al.

(10) Patent No.: US 7,294,988 B2
(45) Date of Patent: Nov. 13, 2007

(54) SYNCHRONOUS MOTOR DRIVE UNIT AND A DRIVING METHOD THEREOF

(75) Inventors: Toshiyuki Ajima, Chiyoda-ku (JP); Hideki Miyazaki, Chiyoda-ku (JP); Yukio Kawabata, Chiyoda-ku (JP); Kiyoshi Sakamoto, Chiyoda-ku (JP); Takao Yanai, Chiyoda-ku (JP); Osamu Koizumi, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/294,500

(22) Filed: Dec. 6, 2005

(65) Prior Publication Data
US 2006/0125439 A1 Jun. 15, 2006

(30) Foreign Application Priority Data
Dec. 10, 2004 (JP) .............................. 2004-358115

(51) Int. Cl.
H02P 1/46 (2006.01)
(52) U.S. Cl. ...................... 318/712; 318/700; 318/717; 318/430; 318/431; 318/432; 318/433
(58) Field of Classification Search ................ 318/712, 318/700, 717, 430, 431, 432, 433, 434
See application file for complete search history.

(56) References Cited

U.S. PATENT DOCUMENTS 6,396,229 B1 5/2002 Sakamoto et al.
6,462,492 B1 10/2002 Sakamoto et al.
2003/0233200 A1 12/2003 Petrovic
2005/0218876 A1* 10/2005 Nino .......................... 323/282
2005/0248306 A1* 11/2005 Chen et al. ................. 318/712
2006/0006899 A1* 1/2006 de Larminat et al. ....... 324/772

FOREIGN PATENT DOCUMENTS

EP 0708521 4/1996
JP 09-056199 A 2/1997

(Continued)

OTHER PUBLICATIONS

Abstract of EP0708521 (cited herein as B2), as obtained from escape.net.

(Continued)

Primary Examiner—Karen Masih
(74) Attorney, Agent, or Firm—Crowell & Moring LLP

(57) ABSTRACT

A rotary sensor that outputs two analog signals, such as one sine wave and one cosine wave and has multiple periods within one period of the electrical angle of a motor is employed. The motor is energized at each position for a specified length of time upon its startup by using multiple electrical angles corresponding to the multiple candidate absolute angles obtained from the rotary sensor signal as the initial position of the motor, and the electrical angle at which the motor acceleration becomes maximum is determined as the absolute angle. While the motor drive is in operation, on the other hand, the phase difference $\Delta\theta$ between the phase of the motor at the counter electromotive voltage and the control phase is directly computed from the parameters of the motor, sensed current, voltage command and angle speed so as to correct the shifted position.

20 Claims, 14 Drawing Sheets

FOREIGN PATENT DOCUMENTS

| JP | 10-080188 A | 3/1998 |
| --- | --- | --- |
| JP | 2000-102299 A | 4/2000 |
| JP | 2001-251889 A | 9/2001 |
| JP | 2003299380 | 10/2003 |
| JP | 2004-208438 A | 7/2004 |

OTHER PUBLICATIONS

Abstract of JP2003299380 (cited herein as B3), as obtained from escape.net.

* cited by examiner (1) AXIAL CROSS-SECTION (2) SECTION A-A'

(3) SECTION B-B'

(1) AXIAL CROSS-SECTION (2) SECTION B-B'

(3) SECTION B-B'

| DIFFERENCE IN INTENSITY OF SENSED SIGNALS | SELECTION SIGNAL | INCLINATION OF SELECTION SIGNAL | ABSOLUTE ANGLE |
|---|---|---|---|
| V≦U≦W | U-PHASE | + | −30~30 |
| V≦W≦U | W-PHASE | − | 30~90 |
| W≦V≦U | V-PHASE | + | 90~150 |
| W≦U≦V | U-PHASE | − | 150~210 |
| U≦W≦V | W-PHASE | + | 210~270 |
| U≦V≦W | V-PHASE | − | 270~330 |

SYNCHRONOUS MOTOR DRIVE UNIT AND A DRIVING METHOD THEREOF

CLAIM OF PRIORITY

The present application claims priority from Japanese application serial No. 2004-358115, filed on Dec. 10, 2004, the content of which is hereby incorporated by reference into this application.

FIELD OF THE INVENTION

The present invention relates to a synchronous motor drive unit and driving method thereof using rotary sensor, particularly to ones suitable for an application of the motor that accelerates and decelerates from zero speed (standing) up to high speed.

BACKGROUND OF THE INVENTION

One of the methods of driving a synchronous motor (hereinafter simply called as motor) is to employ position sensor for sensing the magnetic pole position of rotor. Position sensor in this description means ones including resolver or absolute encoder that cannot only sense the rotating angle in rotation but also determine the absolute position in standing. In order to drive a motor efficiently, however, matching the position sensor with the counter electromotive voltage (magnetic pole position of the motor rotor) very much accurately is inevitable, and several methods for it have been disclosed.

Japanese Patent Laid-Open No. Hei 09 (1997)-56199 discloses a technique where the voltage and current applied to the armature coil are sensed and the magnetic pole position of the rotor is estimated, and then the shift of position is sensed from the error between the rotating position sensed by the position sensor and the pole position, and the shift is corrected accordingly.

Japanese Patent Laid-Open No. Hei 10 (1998)-80188 discloses a technique where the magnetic pole position is estimated from the motor current and drive voltage, motor constant and certain speed, and the mounting error of the position sensor is corrected accordingly.

Japanese Patent Laid-Open No. 2000-102299 discloses a technique where the drive is equipped with a position estimating means that estimates the phase difference $\Delta\theta$ between the reference position of the rotor of a synchronous motor and the reference position of the position sensor only from the sensed motor current, and the phase difference of the position sensor is corrected accordingly.

Japanese Patent Laid-Open No. 2001-251889 discloses a formula for estimating the shift of axis in sensorless control.

SUMMARY OF THE INVENTION

As described in the Patent Document 3, synchronous motor for driving a vehicle employs a resolver with high sensing accuracy and reliability as the position sensor that cannot only senses the rotating angle in rotation but also determine the absolute position in standing. If the resolver fails, however, engine unit or transmission unit must be removed from the vehicle and the unit be disassembled for repair. In addition, resolver must be handled very carefully even in case the motor is removed for replacing some parts in the transmission unit. Thus, maintainability has been a problem.

The technique in the Patent Document 1 involves a problem that time delay is caused in the d-q conversion of the motor voltage and motor current because the angle position after correction is employed and that the delay is easy to result in a significant error between the motor voltage and motor current and accordingly the sensing accuracy of the shift of position becomes poor.

According to the Patent Document 2, estimating computation of the magnetic pole position becomes available only when the motor rotating speed is so controlled as to be constant in a range and the d-axis current be zero. Consequently, there arises a problem that, if the d-axis current through the actual motor cannot become zero because the rotating stable is unstable or the position sensor is not mounted accurately, the sensing accuracy of the mounting error becomes poor.

The technique in the Patent Document 3 involves a problem that, because the high-frequency voltage used for sensing is superposed onto the motor drive voltage, high-frequency noise is caused and efficiency becomes low.

An object of the present invention is to offer a synchronous motor drive unit and a driving method thereof that improves the sensing accuracy of the magnetic pole of synchronous motor, accelerating and decelerating very quickly from standing to high speed, even in case a rotary sensor with high maintainability is employed.

Rotary sensor in this description is preferred to be one with which the rotating angle can be sensed during the rotation and at least multiple candidate angles within 360 degrees can be determined in the standing, and direct sensing of an absolute position is not required in the standing. However, a position sensor that can sense the rotating angle during the rotation and determine the absolute angle even in the standing is included.

The present invention, in an aspect, is equipped with a rotary sensor that generates an output signal with multiple periods within one period of the electrical angle (absolute angle) of a synchronous motor, energizes the motor at each position for a specified length of time upon its startup, by using the multiple electrical angles θn of the motor corresponding to the multiple angles sensed by the rotary sensor as the initial position of the motor, and determines the electrical angle at which the motor acceleration becomes maximum among the respective angles of energization as the absolute angle of the motor.

The present invention, in another aspect, senses the absolute angle θs of the motor based on the output signal of the position sensor, obtains the phase difference $\Delta\theta$ between the phase of the motor at the counter electromotive voltage and the control phase through computation using at least the parameters of the motor and sensed current, and corrects the absolute angle θs with this phase difference.

According to a preferred embodiment of the present invention, even in case a rotary sensor with high maintainability is employed, degradation of the sensing accuracy of the magnetic pole position by the rotary sensor can be eliminated and high-efficiency drive of synchronous motor can be realized.

Other objects and characteristics of the present invention are included in the following description on preferred embodiment.

DESCRIPTION OF THE PREFERRED EMBODIMENTS

A motor drive unit for vehicle according to an embodiment of the present invention is described hereunder, using drawing figures.

Figure 1:
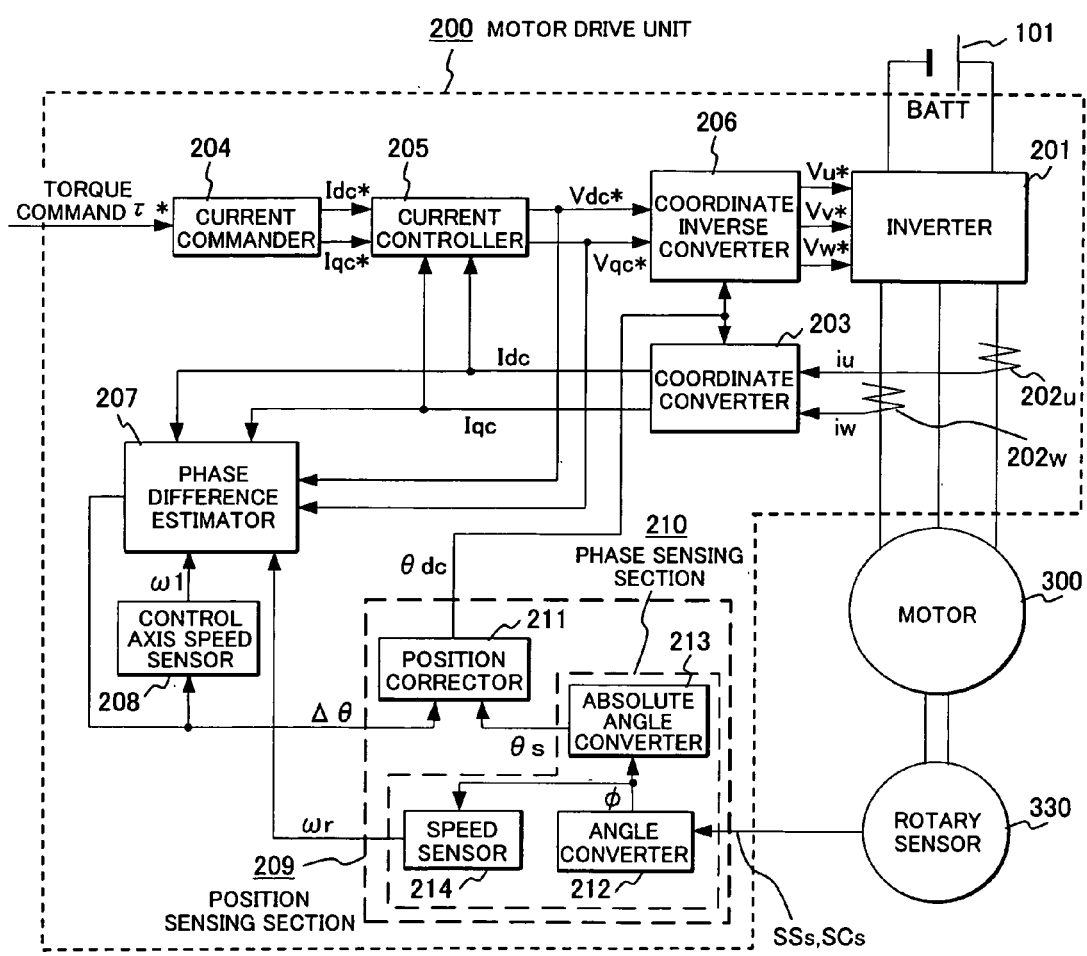
FIG. 1 is overall control block diagram of a motor drive unit according to an embodiment of the present invention.

FIG. 1 is an overall control block diagram of a motor drive unit according to an embodiment of the present invention.

Power is supplied from a battery 101 to a permanent magnet synchronous motor (motor) 300 via a motor drive unit 200. The battery 101 serves as the DC power supply for the inverter 201 and power is converted into three-phase variable-voltage & variable-frequency AC by the inverter 201 and applied to the motor 300. DC voltage necessary for controlling the voltage to be applied to the motor 300 is sensed by a DC voltage sensor (not shown). Motor current sensor 202u, 202w sense the motor current necessary for computing the magnetic pole position. A rotor coordinate converter 203 converts the coordinate from the motor currents iu, iw sensed by the motor current sensors 202u, 202w based on the phase θdc of the virtual rotor position dc-axis and obtains the dc-axis current Idc and qc-axis current Iqc on the virtual rotary coordinate system dc-qc used for the control. These currents Idc and Iqc are observable current (observed value) converted from the sensed motor currents iu and iw, and they are called the observed current hereinafter. The observed currents Idc, Iqc are so controlled by a current controller 205 as to follow the d-axis and q-axis current commands Idc*, Iqc* outputted from a current commander 204, and the d-axis and q-axis voltage commands Vdc*, Vqc* are computed accordingly. A coordinate inverse converter 206 converts the coordinate from the voltage commands Vdc*, Vqc* based on the phase θdc of the virtual rotor position dc-axis and generates three-phase voltage commands Vu*, Vv*, Vw*. The inverter 201 is equipped with a PWM modulating section, drive circuit and inverter main circuit, any of which is not shown. In this PWM modulating section, well-known pulse width modulation (PWM) signal is generated based on the three-phase voltage commands Vu*, Vv*, Vw* so as to control to turn on/off the semiconductor switching device in the inverter main circuit via the drive circuit.

Torque command τ* is generated by a power train C/U (control unit) at a higher level and the current commander 204 generates the d-axis, q-axis current commands Idc*, Iqc* corresponding to the torque command τ*.

A phase difference estimator 207, constituting an important part of this embodiment, computes the phase difference Δθ in the output of the rotary sensor 330 from the output of the rotary sensor 330 and phase of the induction voltage estimated from an electric sensor signal, to be explained hereunder. That is, the induction voltage of the motor 300 is estimated from the voltage commands Vdc*, Vqc*, sensed current Idc, Iqc, motor angle speed ω1 and motor parameters r, Ld, Lq, and the phase difference Δθ in the output of the rotary sensor 330 is computed by the formulas (5) and (6), to be explained later. The frequency ω1 of the DC voltage applied to the motor is obtained from this phase difference Δθ by a control axis speed sensor 208. The control axis speed sensor 208, equipped with a phase difference compensating function (not shown) that compensates the effect of errors of the above parameters contained in the estimated phase difference Δθ, generates a phase difference compensation variable Δθ* and the frequency ω1 of the voltage applied to the motor is obtained from the phase difference compensation variable Δθ* and phase difference Δθ. Normally, however, the phase difference compensation difference Δθ* is set so that the phase difference Δθ=0 holds true. Concept of the phase difference estimator 207 will be described in detail after the construction in FIG. 1 has been explained completely.

A position sensor 209, constituting another important part of this embodiment, is equipped with a phase sensing section 210 and position corrector 211, and the phase sensing section 210 is equipped with an angle converter 212, absolute angle converter 213 and speed sensor 214. In the angle converter 212, the sensor-sensed angle ϕ is obtained from the sensor signals SSc, SCs from the rotary sensor 330, and converted into an absolute angle θs of electrical angle necessary for driving a motor so as to sense the phase of the motor rotor (magnetic pole position of the rotor). The speed sensor 214 senses the actual rotating speed of the motor as angle speed ωr from the sensor-sensed angle ϕ sensed by the angle converter 212. The absolute angle converter 213, having a function for determining an initial startup position, to be explained later, obtains the absolute angle θa at the initial startup position from the relationship between the sensor-sensed angle ϕ and magnetic pole position of the motor 300 and converts the sensor-sensed angle ϕ, a relative angle into the absolute angle θs. The position corrector 211 outputs the phase θdc of the virtual rotor position dc-axis in which the phase difference Δθ has been corrected by the absolute angle θs.

Concept of the computation in the phase difference estimator 207 is described in detail hereunder.

Formula (1) shows a voltage equation (circuit equation), using a d-q coordinate system, of a general permanent magnet synchronous motor.

$$\begin{bmatrix} Vd \\ Vq \end{bmatrix} = r \begin{bmatrix} Id \\ Iq \end{bmatrix} + \begin{bmatrix} -\omega 1 Lq \cdot Iq \\ \omega 1 Ld \cdot Id \end{bmatrix} + \begin{bmatrix} Ld \cdot pId \\ Lq \cdot pIq \end{bmatrix} + \begin{bmatrix} 0 \\ k_E \omega r \end{bmatrix} \quad (1)$$

Figure 2:
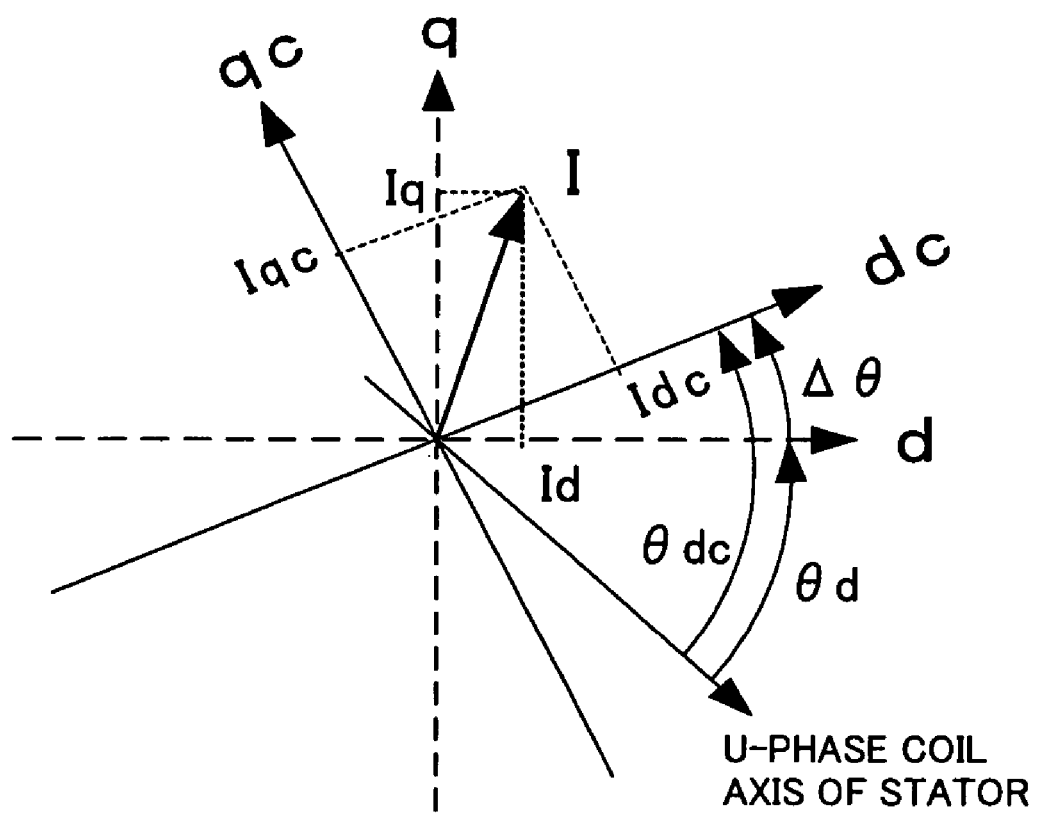
FIG. 2 is vector diagram showing the current of a permanent magnet synchronous motor on a d-q coordinate axis.

FIG. 2 is a vector diagram showing the current of a permanent magnet synchronous motor on a d-q coordinate axis.

Explanation of the coordinate axis is given first. Rotor coordinate is employed in the coordinate system used for the computation, where a coordinate system having the d-axis and q-axis is used and the d-q axis is simply called the real axis. A virtual rotor coordinate used for the control is a coordinate system having the dc-axis and qc-axis and the dc-qc axis is simply called the control axis.

The actual axis is rotating and the rotating speed (angle speed) of the motor is ωr. The control axis is also rotating and the rotating speed is ω1. The control axis speed ω1 is a rotating speed of the control axis but it is equivalent to the inverter output frequency to be applied to the motor when the motor is actually driven. When the d-axis phase in reference to the U-phase coil axis of the stator is regarded θd at an instant on the rotating real axis, the axial shift angle (phase difference) Δθ between the real axis and control axis used for transformation into a voltage equation of the control axis is defined as Δθ=θdc−θd.

Next, how the phase difference Δθ is sensed (computed) is described hereunder.

There are two ways of sensing the phase difference Δθ contained in a position sensing value (absolute angle θs); one is to obtain the phase θd of d-axis by computation and find the phase difference Δθ from the difference from the absolute angle θs, and the other is to obtain the phase difference Δθ directly by computation.

The first way is a method of obtaining the rotating speed (ω1=ωr) by transforming the Formula (1) and find the angle by integration. In order to obtain Vd, Vq and Id, Iq in the Formula (1) by the d-q conversion of the three-phase DC quantity of the motor, the angle θd is needed. In a motor drive unit equipped with a rotary sensor or position sensor, however, the d-q conversion uses the absolute angle θs of the sensed position. This absolute angle θs contains the phase difference Δθ, that is, the error.

The phase θdc of the d control axis is at the absolute angle θs and the absolute angle θs contains the phase difference Δθ as explained above. That is to say, when current I is converted by d-q, Iqc, Idc is obtained instead of Id, Iq. Voltage is also determined in a similar manner, although not shown in the figure. These voltages and currents are regarded as Vd, Vq and Id, Iq to be used in the Formula (1). Since values on the real axis are used as Ld, Lq and the computation uses both values on the real axis and values on the control axis, it means that the result contains a computation error affected by the size of the phase difference.

That is to say, if the Formula (1) is employed as it is, the phase θd of d-axis cannot be obtained. Accordingly, computation is repeated so as to converge and estimate the phase difference Δθ. In case of load variation or speed variation, however, convergence to a true phase difference Δθ takes time and the accuracy of the converged result may become low.

There is another method where the d-axis current is controlled to be zero for simplified computation and also the phase difference Δθ is obtained only when the rotating speed is stable and constant so as to improve the sensing accuracy. In order to control the d-axis current to be zero while the phase difference Δθ is contained, however, the phase difference Δθ need to be small enough. In addition, even if the phase difference Δθ is small, sensing error of the phase difference Δθ may increase because the voltage drop in the inductance increases in a range where the motor rotating speed increases. Furthermore, either an offline (no load to the motor) condition where the load variation is small or a condition that the rotating speed becomes sufficiently stable must holds true. In other words, it is difficult to apply this method to an online (actual load to the motor) condition with load variation or to an actuator with small stroke of which speed variation is high and stable rotation range is small.

For example, when a motor is added to a change gear as shown in the later-mentioned FIG. 4, there are two ways of installing the motor: one is a method to install a completely assembled motor in the change gear and the other is a system assembly method to mount motor components (such as stator and rotor) directly in a change gear case so as to complete a motor unit therein. In the former method, the phase difference Δθ can be sensed offline, but in the latter method, online sensing of the phase difference Δθ is inevitable. For small and light size, it is needless to say that the system assembly method is more effective.

Accordingly, the present invention employs the second method that requires to obtain the phase difference Δθ directly from computation. If the phase difference Δθ is obtained directly, the invention becomes applicable to high-response control and, even in case of load variation, stable phase difference Δθ can be obtained. It therefore becomes applicable to an actuator that accelerates and decelerates very quickly. In addition, the phase difference Δθ can be obtained even in a driving method by such as field-weakening control or rectangular wave drive that positively energizes with the d-axis current, and so the present invention becomes applicable to the drive motor for a hybrid car rotating at high speed without any problem.

Computation in the second method above is based on the control axis, where the Formula (2) is obtained by transforming the Formula (1) based on the conception of virtual voltage drop.

$$\begin{bmatrix} Vd \\ Vq \end{bmatrix} = r \begin{bmatrix} Id \\ Iq \end{bmatrix} + \omega 1 Lq \begin{bmatrix} -Iq \\ Id \end{bmatrix} + \\ pLd \begin{bmatrix} Id \\ Iq \end{bmatrix} + \begin{bmatrix} 0 \\ k_E \omega r + \omega 1 (Ld - Lq) Id + (Lq - Ld) pIq \end{bmatrix} \quad (2)$$

The Formula (3) is a transformation from the real axis to the control axis. The formula covers only the current, but the same applies to the voltage.

$$\begin{bmatrix} Id \\ Iq \end{bmatrix} = \begin{bmatrix} \cos\Delta\theta & -\sin\Delta\theta \\ \sin\Delta\theta & \cos\Delta\theta \end{bmatrix} \begin{bmatrix} Idc \\ Iqc \end{bmatrix} \quad (3)$$

By substituting the Formula (3) for the Formula (2) and putting the result in order, the Formula (4) expressing the axial shift Δθ between the control axis and real axis is obtained from the voltage equation using the virtual voltage drop.

$$\begin{bmatrix} Vdc \\ Vqc \end{bmatrix} = r\begin{bmatrix} Idc \\ Iqc \end{bmatrix} + Ld\begin{bmatrix} \frac{dIdc}{dt} \\ \frac{dIqc}{dt} \end{bmatrix} + \left(\omega 1 Lq + Ld\frac{d\Delta\theta}{dt}\right)\begin{bmatrix} 0 & -1 \\ 1 & 0 \end{bmatrix}\begin{bmatrix} Idc \\ Iqc \end{bmatrix} + \{k_E\omega r + \omega 1(Ld - Lq)Id + (Lq - Ld)pIq\}\begin{bmatrix} \sin\Delta\theta \\ \cos\Delta\theta \end{bmatrix} \quad (4)$$

By deducing a formula for obtaining Δθ from the Formula (4), the Formula (5) is obtained.

$$\Delta\theta = \tan^{-1}\left|\frac{Vdc - r \cdot Idc - Ld\frac{dIdc}{dt} + \left[\omega 1 Lq + Ld\frac{d\Delta\theta}{dt}\right]\cdot Iqc}{Vqc - r \cdot Iqc - Ld\frac{dIqc}{dt} + \left[\omega 1 Lq + Ld\frac{d\Delta\theta}{dt}\right]\cdot Idc}\right| \quad (5)$$

In the Formula (5), integration of Δθ (dΔθ/dt) is the only value that cannot be observed in a position sensorless control. Because Δθ=θdc−θd, however, (dΔθ/dt) can be expressed by the Formula (6) from the difference between the control axis speed ω1 and real axis speed ωr.

$$\frac{d\Delta\theta}{dt} = \frac{d}{dt}(\theta dc - \theta d) = \omega 1 - \omega r \quad (6)$$

In a preferred embodiment of the invention, the phase difference Δθ is computed directly from the Formulas (5) and (6).

In the sensorless control, since the real axis speed ωr and control axis speed ω1 become a closer value if the permanent magnet synchronous motor is driven stably without being step out, the integration of Δθ is assumed to be zero. In addition, it is well known that, since the motor current quantity and phase change are very small when the motor speed and load are stable, the integration term of the current Idc, Iqc is regarded to be zero, and hence the Formula (7) is obtained.

$$\Delta\theta \simeq \tan^{-1}\left[\frac{Vdc - r \cdot Idc + \omega 1 Lq \cdot Iqc}{Vqc - r \cdot Iqc - \omega 1 Lq \cdot Idc}\right] \quad (7)$$

Since the Formula (7) holds true on condition that the integration of Δθ which is the only value that cannot be observed in the sensorless control method, the motor must be rotating stably. In an electric actuator or motor drive unit for vehicle in which motor has been installed as part of a system, the precondition that the motor is rotating stably does not hold true very frequently. Accordingly, the phase correction is made while the computation of the phase difference Δθ contains a lot of errors, resulting in a problem that the phase difference becomes rather greater.

On the contrary, since the motor drive unit according to the embodiment of the invention is equipped with a rotary sensor, the integration of Δθ, the only value that cannot be observed in the sensorless control can be computed. In other words, in case the angle speed ωr of the motor can be sensed by a rotary sensor as in this embodiment, the phase difference Δθ can be computed according to the theoretical Formulas (5) and (6). Accordingly, even in case the motor has been installed as part of the system, the phase difference Δθ can be obtained accurately irrespective of the operating conditions such as transition condition with load variation or upon acceleration or deceleration, and so high-accuracy phase correction becomes available.

If the computation adds heavy burden to a microcomputer, the phase difference Δθ can be obtained by time integration of the Formula (6), and thereby the computing time can be drastically shortened than in computing the Formula (5). Accordingly, computation for the phase difference estimation does not give any impact upon the control period that is determined from the correlation with other control processing, and hence the motor can be driven up to high speed.

In addition, if the sensor sensitivity or sensing phase delay is affected by the frequency response of the rotary sensor or the like in high-speed rotation of the motor, which will be explained later, motor drive using sensor can be switched to sensorless motor drive. With this change, motor can be driven without lowering the efficiency even in case of high-speed rotation of the motor.

Although the Formula (7) uses the control axis speed ω1, the rotating speed (angle speed) ωr will also do. In addition, since the angle speed ωr of the motor can be sensed accurately even in case such position sensor as resolver is employed, the present invention is applicable where the afore-mentioned inconveniences following the resolver do not exist.

Figure 3:
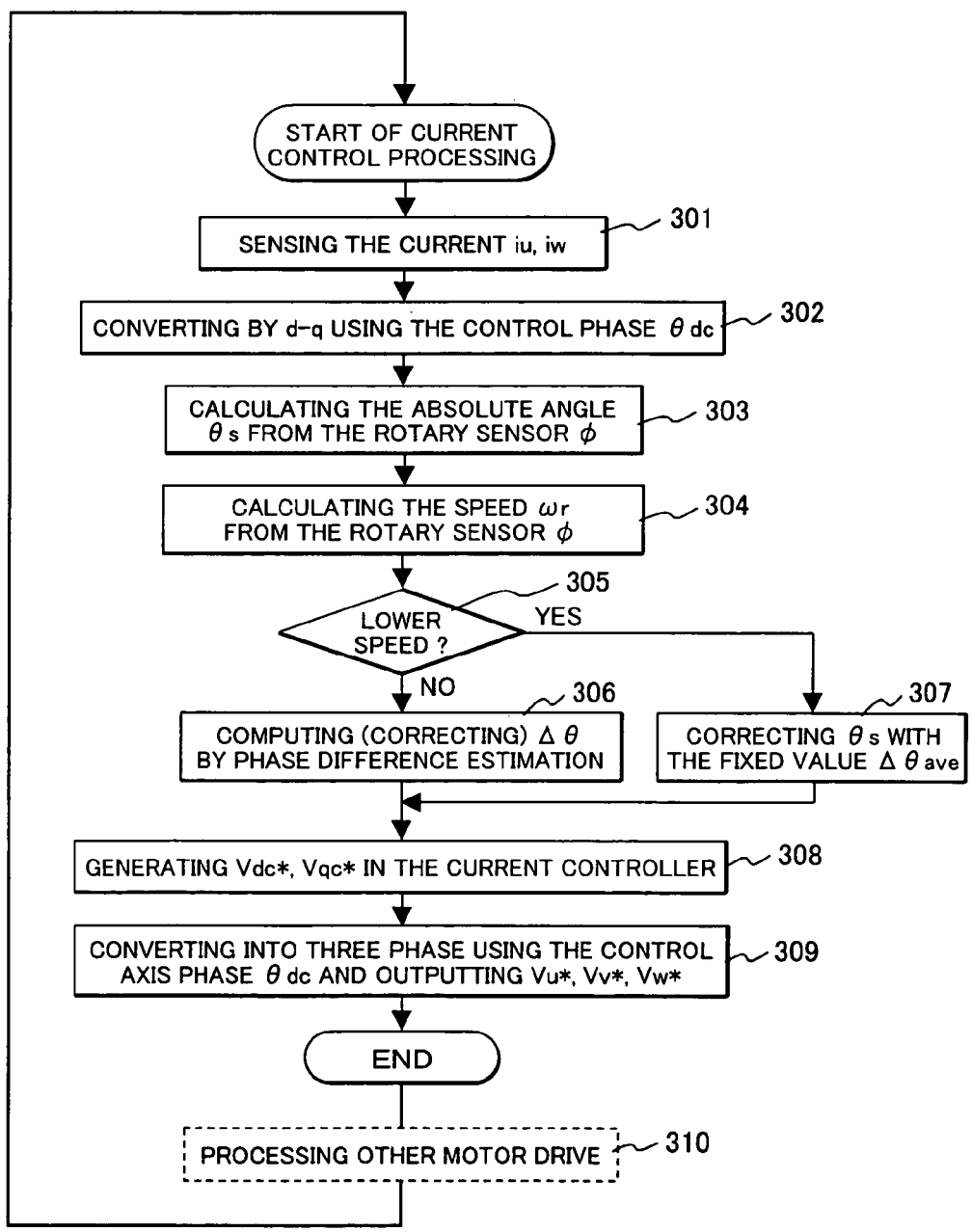
FIG. 3 is overall control flowchart of the motor drive unit according to an embodiment of the present invention.

FIG. 3 is an overall control flowchart of the motor drive unit according to an embodiment of the present invention. Current control processing is a routine that is processed at high speed repeatedly at the period of PWM carrier in case the motor is energized with sine-wave current. To start with, the motor current iu, iw is detected in step 301 and converted by d-q using the phase θdc of the control axis in step 302. In step 303, absolute angle θs, i.e. position sensing value is calculated from the sensor-sensed angle φ of the rotary sensor 330. In step 304, the motor angle speed (rotating speed) ωr is calculated from the time variation of the sensor-sensed angle φ of the rotary sensor. In step 305, whether the rotating speed ωr is lower than a specified rotating speed or not is judged. This specified rotating speed is a speed at which the counter electromotive force of the motor is too small as compared to the virtual voltage drop and so computation error becomes significant. If the speed is judged to be lower than the specified rotating speed, the phase θdc of the d-control axis is obtained by correcting the absolute angle θs with the average Δθave of the phase difference Δθ in step 307. The average Δθave is stored in a ROM upon shutting down the system and read into a RAM when the system is actuated again or powered on. It is preferable that the correlation between the absolute angle θs and phase difference Δθ in one period is stored in a RAM and tabulated dynamically and that the table is referred in case the speed is lower than the specified speed. It is possible to so construct the system that the table is escaped into a ROM in case of system shutdown.

Step 306 is performed when the motor rotating speed ωr is greater than the specified rotating speed, and the phase difference Δθ is obtained from the equations shown as the Formulas (5) and (6). At the same time, the average Δθave of the phase difference Δθ to be used in step 307 is obtained here and the absolute angle θs and phase difference Δθ are tabulated here also. In addition, the absolute angle θs is corrected with the phase difference Δθ to obtain the phase θdc of the d-control axis. Current control computation is performed in step 308 and the voltage commands Vdc*, Vqc* are generated; and coordinate conversion from two-phase to three-phase is performed using the phase θdc of the control axis in step 309 and three-phase voltage commands Vu*, Vv*, Vw* are outputted.

According to this embodiment, since the phase difference Δθ resulting from the mounting error or sensing error of the rotary sensor or position sensor is corrected as described above, the phase difference Δθ between the phase θdc used for the control and the magnetic pole position of the actual motor can be calculated directly even in case sensing delay due to the control period is caused. Accordingly, the phase difference Δθ can be always controlled to become minimum, and idealistically to be zero. Since the phase difference Δθ can be corrected accurately and the phase difference Δθ is controlled to become zero, position sensing error can be corrected accurately even in case linear Hall IC, which is apt to cause bigger position sensing error than a high-precision position sensor such as resolver, is employed.

Figure 4:
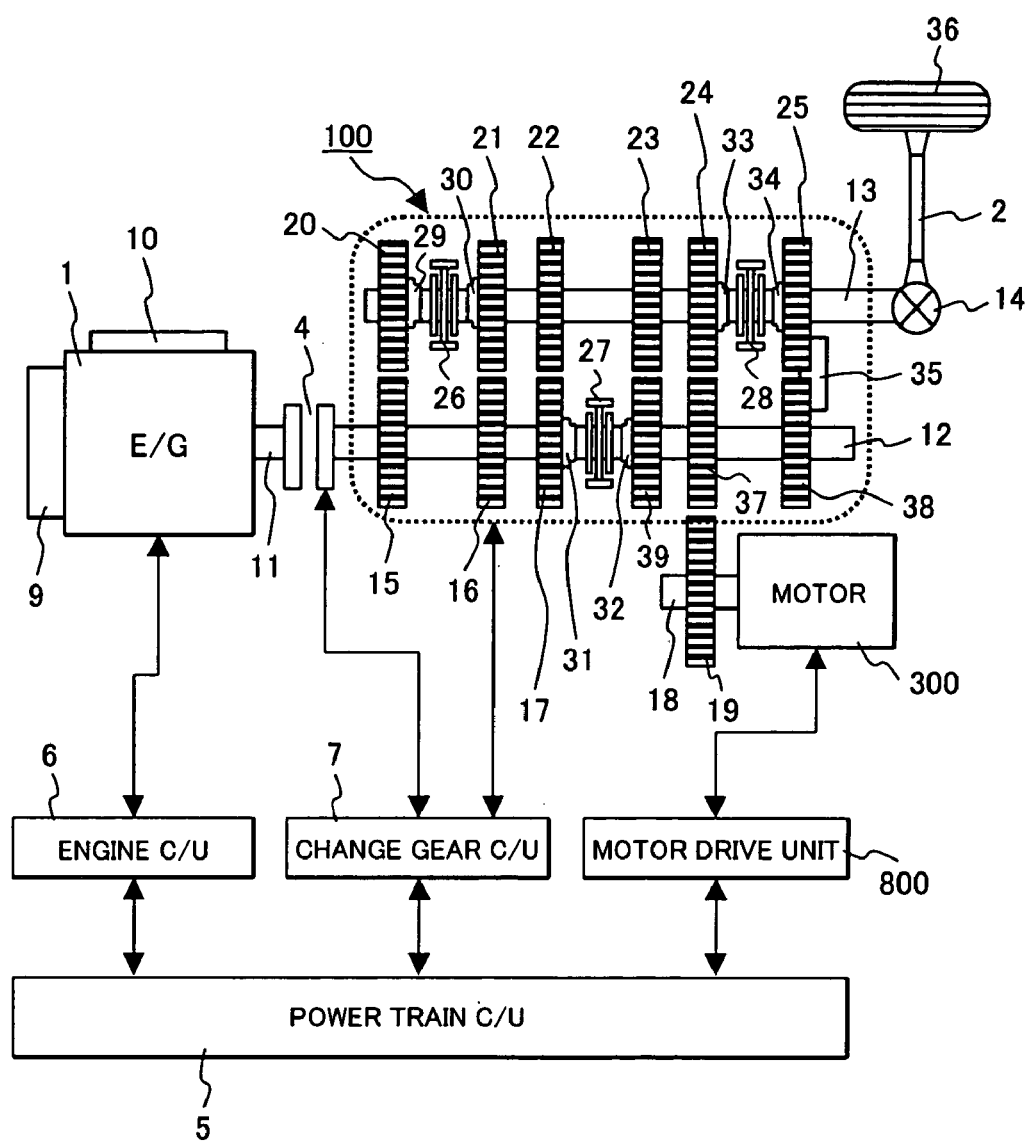
FIG. 4 is construction of a vehicle drive system, where the motor drive unit according to an embodiment of the present invention is applied to hybrid car.

FIG. 4 shows the construction of a vehicle drive system, particularly the construction of a hybrid car system, to which the motor drive unit according to an embodiment of the present invention is applied. An engine 1 is actuated by a starter 9. In the engine 1, suction air volume is controlled by an electronic control throttle 10 installed on a suction pipe (not shown) and a sufficient amount of fuel for this air volume is injected from a fuel injector (not shown). In addition, ignition timing is determined from signals indicating the air-fuel ratio determined from the above air volume and fuel amount, engine speed, and so on and the fuel is ignited by an igniter (not shown).

On the input shaft 12 of a change gear set 100, a gear 17 with dog gear 31, gear 39 with dog gear 32, hub sleeve 27, and gears 15, 16, 37, 38 are mounted. The gears 15, 16, 37, 38 are fastened on the input shaft 12 and the gear 17 and gear 39 are so installed as not to move in the axial direction of the input shaft 12. The hub sleeve 27 is connected with the input shaft 12 via a dog mechanism (not shown) that can move in the axial direction of the input shaft 12 but is restricted in the rotating direction.

On the output shaft 13 of the change gear set 100, a gear 20 with dog gear 29, gear 21 with dog gear 30, hub sleeve 26, gear 24 with dog gear 33, gear 25 with dog gear 34, hub sleeve 28, and gears 22, 23 are mounted. The gears 22, 23 are fastened on the output shaft 13 and the gears 20, 21, 24, 25 are so installed as not to move in the axial direction of the output shaft 13. The hub sleeves 26, 28 are connected with the output shaft 13 via a dog mechanism (not shown) that can move in the axial direction of the output shaft 13 but is restricted in the rotating direction.

The gears 20 and 15, gears 21 and 16, gears 17 and 22, gears 39 and 23, and gears 24 and 37 are engaged with each other and constitute pairs of different gear ratio for transmitting torque from the input shaft 12 to the output shaft 13. In addition, the gear 25 is connected with the gear 38 via a reverse gear 35 and serves also to reverse the rotating direction of the input shaft 12 and output shaft 13 with the aid of the reverse gear 35.

A gear train consisting of the gears 15, 20 is the first shift, a gear train of the gears 16, 21 is the second shift, a gear train of the gears 17, 22 is the third shift, a gear train of the gears 39, 23 is the fourth shift, a gear train of the gears 37, 24 is the fifth shift, and a gear train consisting of the gears 25, 35, 38 is the reverse.

In order to transmit torque from the input shaft 12 to the gear 17 and gear 39, the dog gear 31 or dog gear 32 is directly connected with the hub sleeve 27 by an engagement groove (not shown).

A clutch mechanism consisting of the hub sleeve 27, dog gear 31 and dog gear 32 is called a dog clutch, which can transmit the torque of the input shaft 12 efficiently to the output shaft 13, resulting in fuel cost reduction.

The hub sleeve 26, dog gear 29 and dog gear 30 also constitute a dog clutch, and also the hub sleeve 28, dog gear 33 and dog gear 34 constitute a dog clutch, both of which operates similarly as the above dog clutch, that is, transmits torque from the gears 20, 21 and gears 24, 25 to the output shaft 13.

A clutch 4 is installed between the crankshaft 11 of the engine 1 and the input shaft 12, and power of the engine 1 can be transmitted to the input shaft 12 by connecting the clutch 4. By releasing the clutch 4, power transmission from the engine 1 to the input shaft 12 can be shut off. A dry single-disc type friction clutch is used as the clutch 4 and the torque transmitted from the engine 1 to the input shaft 12 can be adjusted by controlling the pressing force of the clutch 4. In addition, any clutch, including a wet multiple-disc type friction clutch or electro-magnetic clutch, that can control the toque to be transmitted is applicable. The clutch 4 is also employed on an ordinary gasoline engine vehicle and car can be started to run by pressing the clutch 4 gradually.

The output shaft 13 of the change gear set 100 is equipped with a final gear 14 and the final gear is connected with tires 36 via a vehicle drive shaft 2.

A gear 19 is fastened on a motor output shaft 18 and the gear 19 is engaged with the gear 37. Hence, torque of the motor 300 can be transmitted to the input shaft 12.

The engine 1 and motor 300 are controlled by an engine C/U (control unit; the same hereinafter) 6 and motor C/U 800, respectively. The clutch 4 and change gear set 100 are controlled by a change gear C/U 7. Various signals are inputted into a power train C/U 5 from an acceleration pedal opening sensor, vehicle speed sensor, and so on, none of which is shown. At the same time, the operating conditions (speed, torque, gear ratio, etc.) of the engine 1, motor 300, clutch 4 and change gear set 100 are inputted and the power train C/U 5 controls the engine C/U 6, motor C/U 800 and change gear C/U 7 as a whole.

If a car is started to run by the drive force of the motor 300, the hub sleeve 26 is connected with the gear 29 and the clutch 4 is set released so as to generate the motor 300 torque in a normal direction (forward direction) to start the car to run smoothly. Then, by connecting the clutch 4, drive force of the car is switched to that of the engine. Thus, fuel consumption can improve by driving the car by the motor drive in a low load range (at the start, for example) where the engine efficiency becomes lower.

Figure 5:
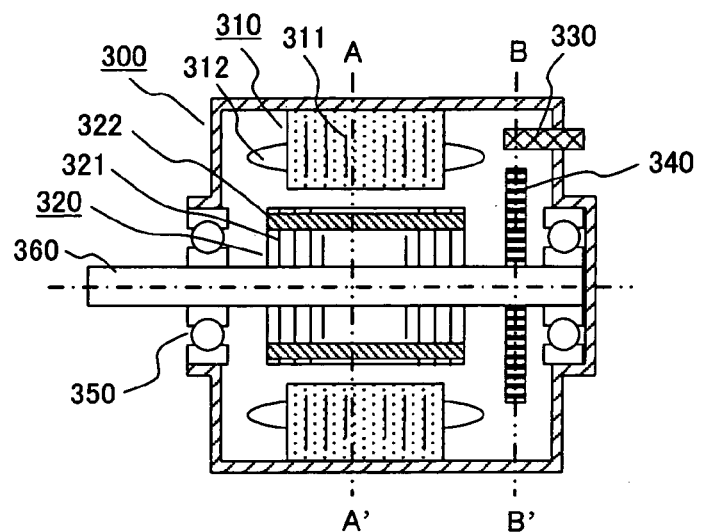
FIG. 5 is construction of a drive motor for vehicle according to an embodiment of the present invention.
Figure 5:
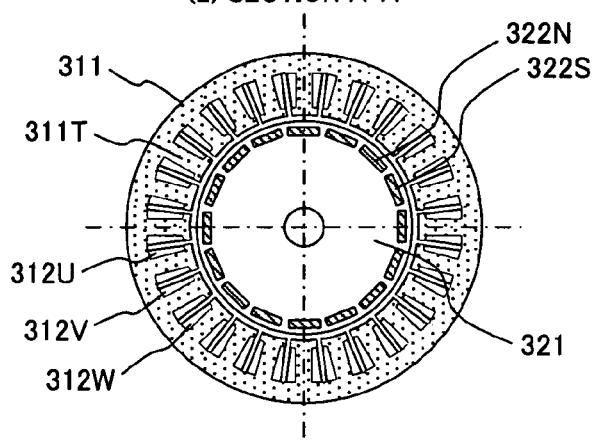
Figure 5:
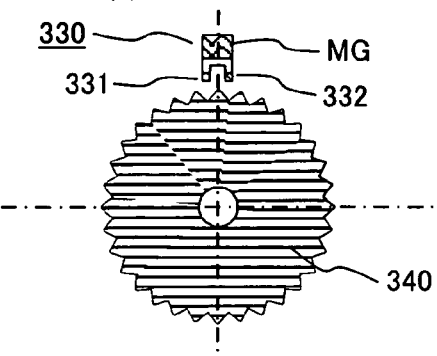

FIG. 5 shows the construction of a drive motor for vehicle according to an embodiment of the present invention, showing the cross-section of the motor 300 in FIG. 4. FIG. 5(1) is a cross-section of the motor 300 in the axial direction, FIG. 5(2) is the A–A' cross-section in the radial direction, and FIG. 5(3) is the B–B' cross-section in the radial direction, each of which particularly showing a sensor rotor and sensor unit of the rotary sensor. The motor in this embodiment is a permanent magnet synchronous motor utilizing permanent magnetic field, particularly an embedded-magnet type permanent magnet synchronous motor in which permanent magnet is embedded in the rotor core. It is an internal type motor in which a rotor 320 (comprising a rotor core 321, permanent magnet 322, and motor shaft 360) is installed inside the stator core 311 allowing for some gap, and also a concentrated coil motor in which coil 312 is wound around each unit tooth 311T of the stator core. The rotor (motor rotor) 320 and sensor rotor 340 support the motor shaft 360 rotation at the bearing 350, and a rotation sensor 330 is fastened on the motor housing. The stator 310 is fastened on the motor housing by press-fitting or with the aid of key grooves. The coil 312 of the stator 310 comprises of three-phase coils 312U, 312V, 312W for U, V, W in order. The permanent magnet 322 of the rotor 320 comprises of permanent magnet 322N of which N pole is directed to the gap and permanent magnet 322S of which S pole is directed to the gap, arranged alternately. In this construction, rare earth magnet such as Nd—Fe—B is suitable as the material of the permanent magnet 322 from the viewpoint of retention force and cost, but other rare earth magnet or ferrite magnet is also applicable without problem but the output characteristic of the motor may be different.

In this embodiment, the motor shown is made to 2-to-3 configuration having 16 poles and 24 slots (motor with the number of poles=integral multiple of 2 and the number of slots=integral multiple of 3) but other configuration such as 4-to-3, 8-to-9 or 10-to-12 will also do. In addition, description of this embodiment is based on an embedded magnet type concentrated-winding synchronous motor, but surface magnet type will also do and distributed-winding motor will also do. Furthermore, other DC motor such as induction motor will also be applicable.

The rotary sensor comprises a magnetic sensor rotor 340 and rotary sensor (unit) 330, and the outside (sensor unit side) of the sensor rotor 340 is provided with gear teeth (number of teeth: 32). The sensor unit 330 consists of sensors 331, 332, bias permanent magnet MG and yoke constituting the magnetic path of the bias permanent magnet MG, which as a whole are sealed with resin mold (not shown) to ensure environmental resistance and convenience. The sensor unit is so constructed as to be capable of being removed (installed) easily and fastened on the motor housing with screws (not shown). Each sensor is a packaged type containing a sensor element, amplifying circuit and temperature correcting circuit, but the two sensors can be integrated into a single package. Otherwise, it is also permissible that the sensor device is installed in the sensor unit and other amplifying circuit and temperature correcting circuit are provided on a printed board. Two sensors 331 and 332 are installed at an interval of 90 degrees where a pitch of a gear teeth of the sensor rotor is regarded as a period (360 degrees). The output of the sensors 331, 332 is an analogue voltage level in proportion to the magnetic flux quantity in the gap that varies as the sensor rotor rotates and the gap size under the sensor element changes.

In this construction, the number of teeth in the gear of the sensor rotor 340 is preferred to be an integral multiple of the number of magnetic pole pairs. However, any appropriate number of gear teeth can be determined in view of the resolution of the rotating angle, productivity of the sensor rotor and output frequency (frequency response) of the sensor, and the gear tooth profile is preferred to be such that analog voltage level can be obtained corresponding to the rotating angle of the sensor rotor 340. Hall element is generally employed as the sensor element; in a method using bias magnet as shown in FIG. 5, however, magnetic resistance element will also do since the magnetic flux amount (intensity) of the magnet is sensed. In addition, a resolver type sensor for which an exciting magnetic flux is caused through the sensor rotor and the amount of the exciting magnetic flux is sensed is also applicable. In this type, high-frequency magnetic flux is generally used and therefore, if the amount of magnetic flux is sensed as a voltage output, signal processing using low-pass filter or synchronization of sampling timing with the exciting frequency is needed.

Figure 6:
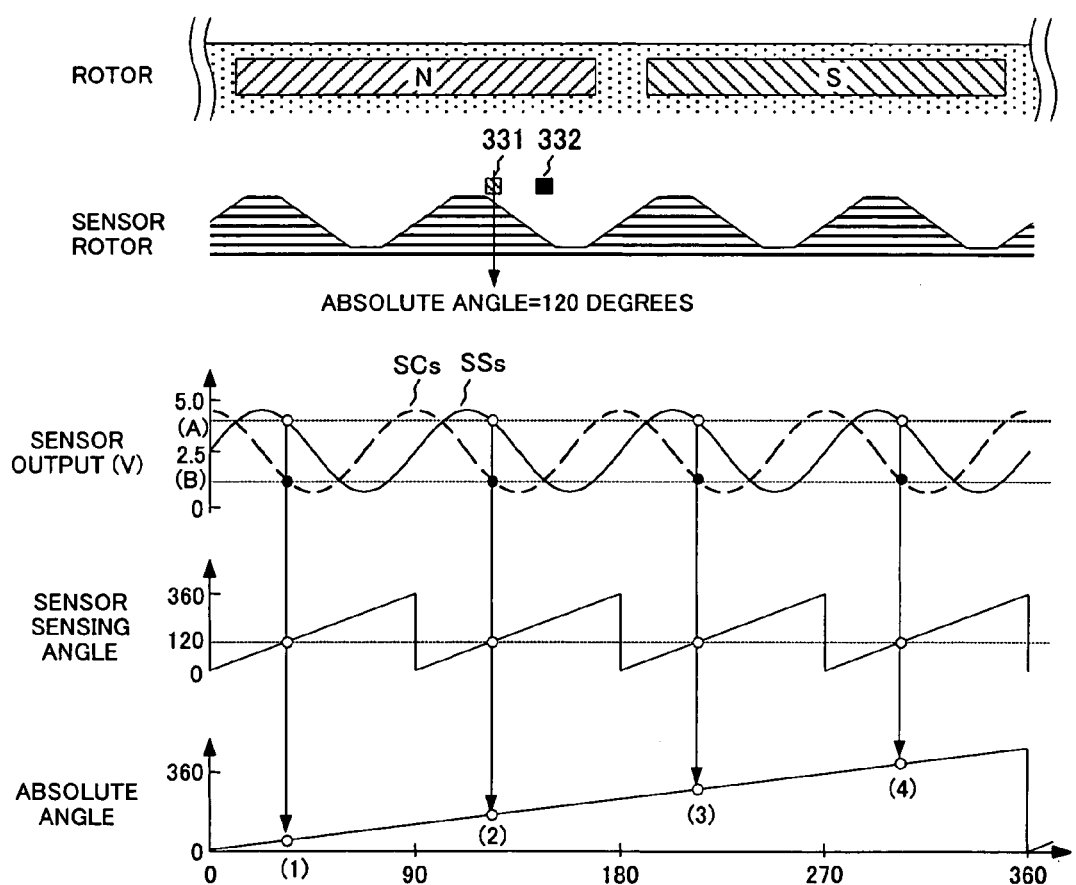
FIG. 6 is rotary sensor of the motor drive unit and signal waveform according to an embodiment of the present invention.
Figure 7:
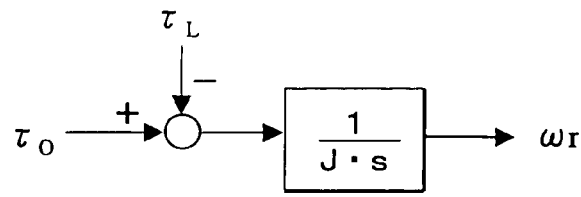
FIG. 7 is basic block diagram for sensing the maximum acceleration of a motor according to an embodiment of the present invention.
Figure 8:
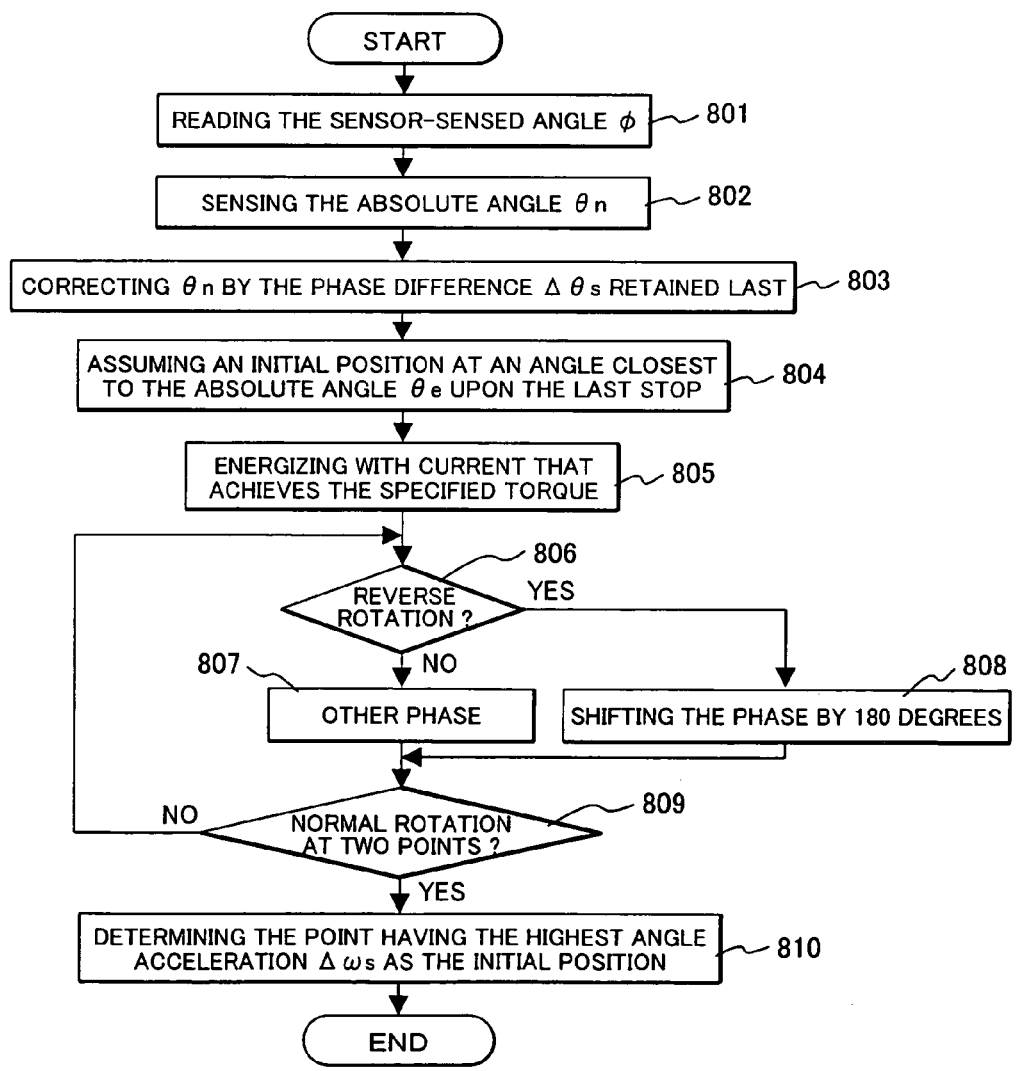
FIG. 8 is flowchart for sensing the initial startup position of the motor drive unit for vehicle according to an embodiment of the present invention.

Next, how to sense the initial startup position by the rotary sensor in an embodiment of the present embodiment is described hereunder, using FIGS. 6 to 8.

FIG. 6 shows the rotary sensor and signal waveform; FIG. 7 is a basic block diagram for sensing the maximum acceleration; and FIG. 8 is a flowchart for sensing the initial startup position.

Shown in FIG. 6 are, from top to bottom, a pair of magnets of the motor rotor, positional relation of the sensor rotor and sensor element to the motor rotor, output signals of the two sensors, sensor-sensed angle obtained from the two sensor outputs, and absolute angle of the magnetic pole position of the motor necessary for the motor drive. The absolute angle of the magnetic pole position is an electrical absolute angle (electrical angle) and is different from the mechanical absolute angle for which one revolution of the motor rotor is 360 degrees. As explained previously, the number of teeth of the sensor rotor 340 for a pair of magnets of the motor rotor 320 is 32, greater by four times. The periodic position of the magnet pole of the motor rotor 320 is agreed with the periodic position of the teeth of the sensor rotor 340, and the pitch of the sensors 331, 332 is one-fourth the tooth pitch of the sensor rotor 340 (90-degree interval where a tooth pitch is 360 degrees). In this figure, the output signal SS of the sensor 331 is shown as a sine wave and the output signal SC is shown as a cosine wave, and the sensor 331 is positioned at an absolute angle of 120 degrees in this instance. With a combination of sensors where the output of the sensor 331 is (A) and that of the sensor 332 is (B), the sensor output level can be determined as a specific angle and it is 120 degrees in the figure. If the output signals of the two sensors are both sine wave, the sensor-sensed angle $\phi$ can be obtained from $\phi = \tan^{-1}$ (SS/SC). If the output signals of the two sensors are both trapezoidal wave, the sensor-sensed angle $\phi$ can be deduced from part of the sensor output signal from which linearity of the signal can be obtained comparatively, which will be described later. In order to drive a motor, however, absolute angle must be obtained. When the sensor-sensed angle is compared to the absolute angle, one of the four points at (1) 30 degrees, (2) 120 degrees, (3) 210 degrees, and (4) 300 degrees corresponds to the absolute angle within its one period, but absolute angle can no way be obtained directly from the sensor-sensed angle.

In this embodiment, as a means for determining the absolute angle from the rotary sensor output, a model shown in FIG. 7 has been assumed to sense the angle acceleration. Load torque $\tau L$ can be varied by the number of revolution $\omega$, but the load variation range in small rotation of the motor rotor 340 can be regarded small and nearly constant because the speed is reduced via a gear train of the change gear. The output torque $\tau o$ of the motor becomes maximum when the current is made constant and the absolute angle agrees with the magnetic pole position of the motor, and the motor angle speed $\omega r$ corresponding to the inertia J of the motor rotor is obtained. "s" is an integration operator. That is, given that the motor angle speed after a specified length of time, T seconds have elapsed is $\omega r'$, the angle acceleration $\Delta \omega r$ is obtained from $\Delta \omega r = (\omega r' - \omega r)/T$. In this processing, the four candidate absolute angles are firstly limited to two candidates, of which rotating direction of the motor agrees with the driving direction, and then one of the candidate absolute angles of which angle acceleration $\Delta \omega r$ becomes maximum in the above computation is selected as the initial startup position. Since the angle acceleration $\Delta\omega s$ using the sensor-sensed angle is a multiple of the angle acceleration $\Delta\omega r$ by four, it is suitable for comparing the angle acceleration.

The specified length of time T above is a time at which the angle acceleration of the motor rotor 340 can be sensed stably and is determined according to the startup inertia and load torque of the motor. In addition, the rotating angle of the motor rotor (rotating angle of the sensor rotor) is sensed as analog voltage. If a microcomputer is used for the computation, the angle can be smallest possible one that depends upon the resolution of the A/D converter, and accordingly, the specified length of time T can be set to a very short time.

Furthermore, in case of a motor for driving vehicle, corresponding the sensor-sensed angle with the absolute angle is needed only one time upon the initial startup when the engine key (ignition key) is switched on and vehicle startup is sensed. After this, either for stopping or for starting the vehicle, immediate drive after the standing condition is possible because the absolute angle is retained in the memory. In other words, corresponding the sensor-sensed angle with the absolute angle is not needed but only one time when a small rotation of the motor is available, for example, when the engine key is switched and the dog clutch or clutch 4 is released. Sufficient small rotation of the motor can be even a backrush in a gear arrangement so far as a sensible little rotation can be obtained. For the restart of a vehicle from the standing (idling stop) condition after the above occasion, the absolute angle in that occasion, that is, the correlation for converting the sensor-sensed angle (relative angle) to an absolute angle has been stored in the microcomputer. Accordingly, motor driving capable of immediate torque output meeting the command can be realized in a standing condition of the motor.

Next, how to determine the initial startup position is described hereunder, using the flowchart in FIG. 8.

The processing in FIG. 8, when applied for example to the motor drive unit for driving vehicle, is an initial position determining process that is carried out only one time in response to key switching. In response to the key switching, the sensor-sensed angle $\phi$ is obtained from the sensor output signal in step 801, and the absolute angle $\theta n$ (n=1 to 4) corresponding to the sensor-sensed angle is obtained in step 802.

In step 803, the absolute angle $\theta n$ is corrected by the phase difference $\Delta\theta s$ retained last time. An absolute angle closest to the absolute angle $\theta e$ stored upon the last stop is assumed to be the initial position in step 804, and in step 805, the motor is so energized that the specified torque can be expected with the motor current.

If the motor rotation is in the normal direction, that is, in the desired rotating direction in step 806, energized phase is changed to the two candidate absolute angles that are expected to cause normal rotation in step 807. If reverse rotation is sensed in step 806, the energized phase is changed to the candidate absolute angles of which phase shifts by 180 degrees from the energized candidate absolute angles in step 808.

If, in step 809, the angle acceleration is obtained from the two candidate absolute angles causing normal rotation, the processing flows to step 810. Otherwise, the processing from step 806 is repeated so as to scan the initial position. In step 810, the angle accelerations of the two candidate absolute angles are compared and the candidate absolute angle exhibiting the highest angle acceleration is finally determined to be the initial position.

In scanning the initial position, the motor rotation caused by energization is corrected by the sensor-sensed angle $\phi$ as needed. It is preferable to perform the step 803 and step 804 but skipping them should not cause a significant error in the result of the scan. Since the number of teeth of the sensor rotor 340 is a four-times multiple of the number of pole pairs of the motor, n=1 to 4 is used in step 802. If, however, the number of teeth of the sensor rotor 340 is a two-times multiple of the number of pole pairs of the motor, it is evident that the initial position is determined instantly as soon as the rotation in the desired direction is obtained from one of the two candidate absolute angles.

Figure 9:
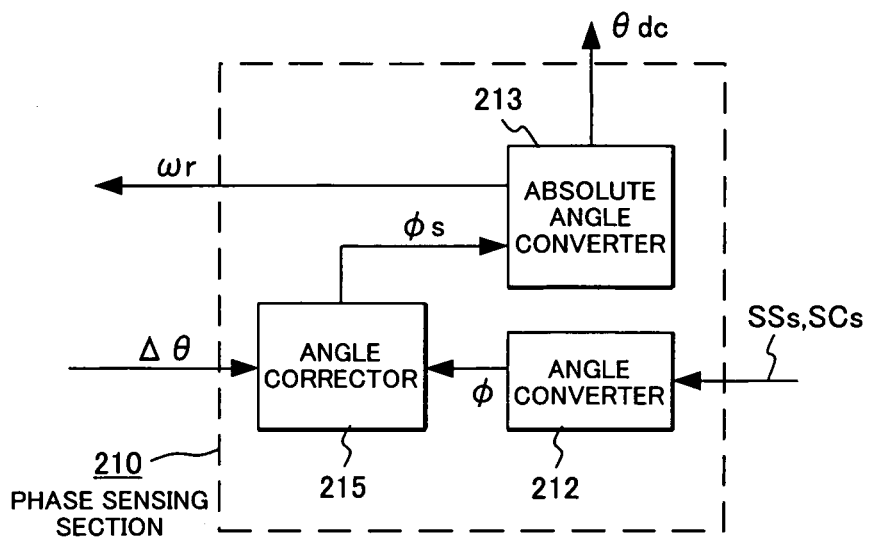
FIG. 9 is functional block diagram of a phase sensing section according to another embodiment of the present invention.
Figure 10:
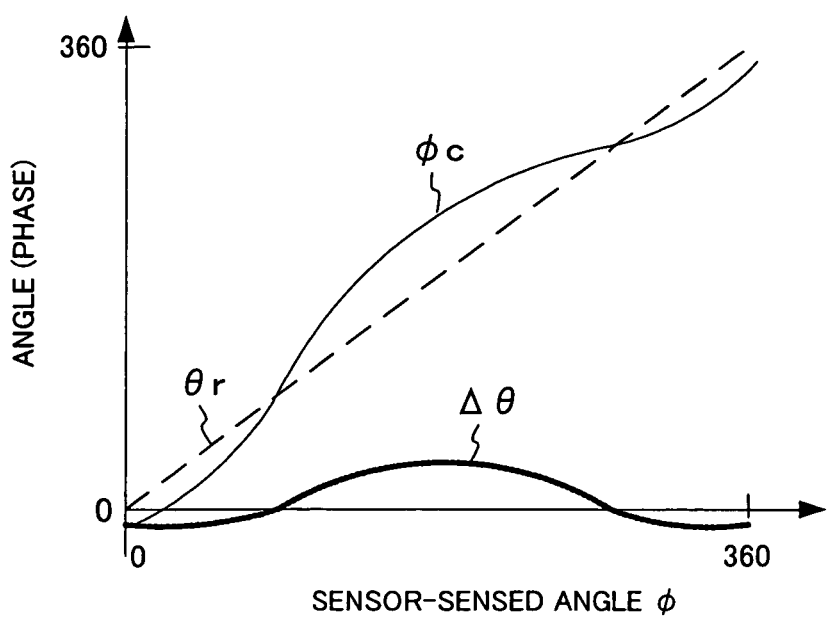
FIG. 10 is figure showing the analog sensor error in an embodiment of the present invention.

Next, the position sensing section 209 of the motor drive unit according to another embodiment of the present invention is described hereunder, using FIG. 9 and FIG. 10. FIG. 9 shows a modified example of the position sensing section 209 of the motor drive unit 200 in FIG. 1, and FIG. 10 shows an analog sensor error at the sensor-sensed angle.

FIG. 9 differs from FIG. 1 in it that there is provided an angle corrector 21 that corrects the sensing error contained in the sensor-sensed angle $\phi$, a relative angle resulting from the distortion in the analog output signals SSs, SCs from the rotary sensor 330. The angle corrector 215 corrects the sensor-sensed angle $\phi$ from the angle converter using the phase difference $\Delta\theta$ from the phase difference estimator 207, and thereby removes sensor mounting error. At the same time, the corrector stores the sensing error contained in a period of the sensor-sensed angle $\phi$ in the form of a correction curve (bold line) of the sensor-sensed angle $\phi$ vs. phase difference $\Delta\theta$ shown in FIG. 10 or a table after broken-line approximation. Based on this, the corrector corrects the sensing error contained in the sensor-sensed angle $\phi$ resulting from the waveform distortion of the analog output signal.

Accordingly, it can correct not only the sensor mounting error but also the affect contained in the sensor due to the variation of linearity and temperature.

Figure 11:
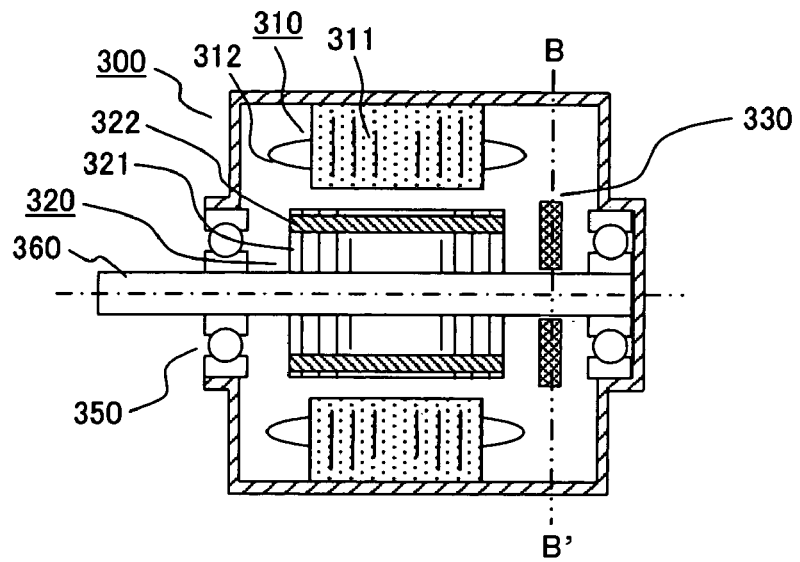
FIG. 11 is construction of a motor in which magnetic flux of the permanent magnet of motor rotor is sensed as rotary sensor according to another embodiment of the present invention.
Figure 11:
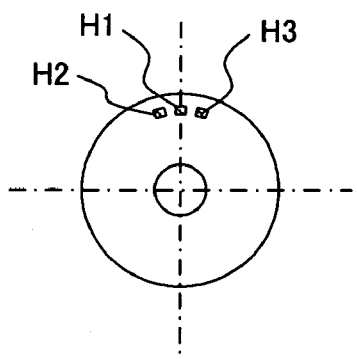
Figure 11:
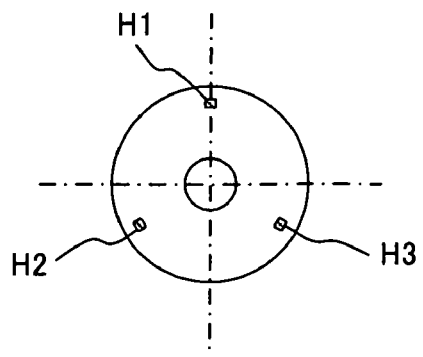
Figure 12:
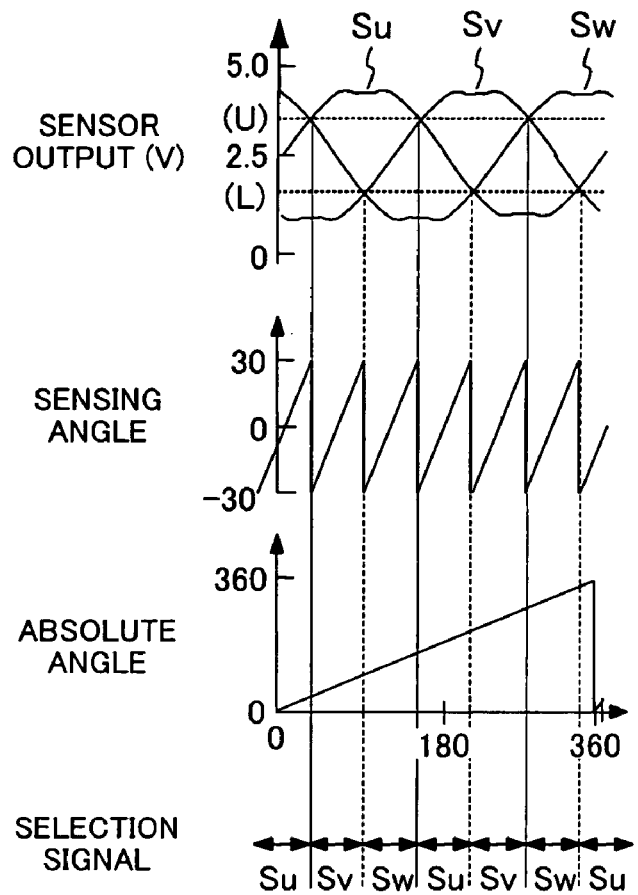
FIG. 12 is figure showing a method of sensing angle from the output signal with distorted waveform of a rotary sensor using linear Hall IC.
Figure 13:
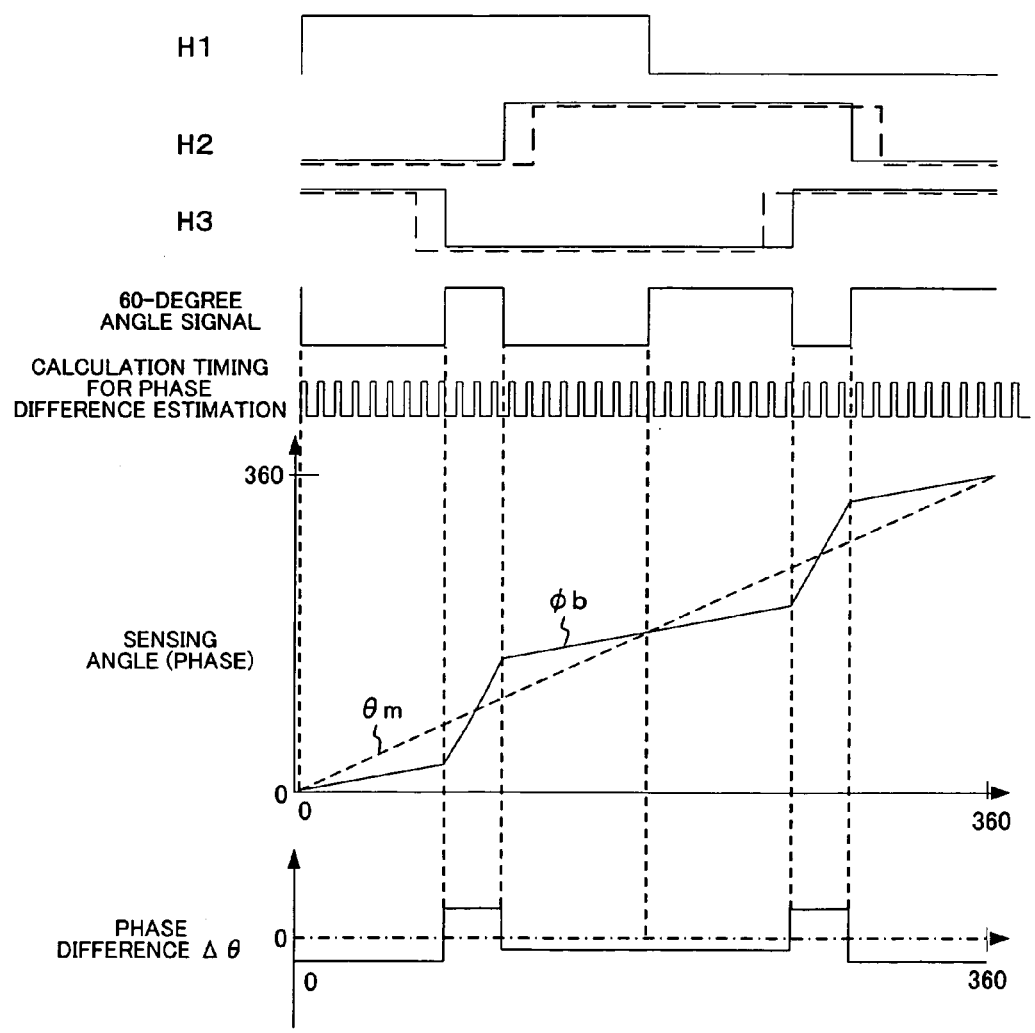
FIG. 13 is figure showing a method of sensing angle in case the rotary sensor outputs pulse waves.

Next, the phase sensing section of the motor drive unit according to another embodiment of the present invention is described hereunder, using FIGS. 11 to 13. FIG. 11 shows the construction of a motor with a rotary sensor which senses the magnetic flux of the permanent magnet of the motor rotor and senses the position; FIG. 12 shows a method of angle conversion in case the output signal of the rotary sensor has a distorted waveform; and FIG. 13 shows a method of angle conversion in case the output signal of the rotary sensor is pulse waves.

FIG. 11 differs from FIG. 5 in it that the rotary sensor senses the magnetic flux of the permanent magnet of the motor rotor. The radial cross-section of the rotary sensor 330 is FIG. 11 is shown in FIG. 11(2). Sensors H1, H2, H3 are installed as shifted respectively by an angle of 120 degrees of the electrical angle of the motor. Each sensor senses the change in the magnetic flux of the same permanent magnet in order of H1→H2→H3 as the motor rotor rotates. When the motor rotor rotates in the reverse direction, this order is reversed. In FIG. 11(3), the sensors are installed as shifted by an angle of 120 degrees of the electrical angle similarly as shown in FIG. 11(2), but differently from FIG. 11(2), they are also shifted by 120 degrees of the mechanical angle, and consequently, the change in the magnetic flux of the magnet sensed by each sensor H1, H2, H3 is that of different magnet. This fact relates to the method of sensing and correcting the installation error of the permanent magnet of the motor rotor, which will be described later in FIG. 13.

FIG. 12 shows an example where a linear Hall IC, which is a package incorporating a sensor element, amplifying circuit and temperature correcting circuit, is employed as the rotary sensor. The output signal of the rotary sensor is a distorted waveform and so it cannot be obtained by using a function of $\tan^{-1}$. Although the waveform of the output signals Su, Sv, Sw of the sensors H1, H2, H3 is a distorted waveform of trapezoidal wave, the sensed angle is obtained by utilizing a fact that distortion is less and waveform is nearly linear in a range of more than 60 degrees near the center of amplitude of the signal waveform. The sensed angle is converted into the absolute angle from 0 to 360 degrees by utilizing the difference in intensity between the sensed signals, that is, the output signals Su, Sv, Sw of the sensors H1, H2, H3. A selection signal is selected by utilizing the difference in intensity of the sensed signals and then the sensed angle is obtained by utilizing the inclination of the selected signal.

An example using three sensors is shown in this description, but use of two sensors will also do without problem if distortion is less and waveform is nearly linear in a range of more than 90 degrees near the center of amplitude within one period (360 degrees) of the sensor output signal. In this case, in FIGS. 11(2) and (3), the two sensors are installed at an interval of 90 degrees of the electrical angle of the motor.

FIG. 13 is an explanatory figure of the method of phase sensing in case a sensor that outputs pulse waves is used as the rotary sensor, wherein Hall IC is employed. Ideal signals H1, H2, H3 of the Hall IC are shown in bold line and the signals in case of shifted sensor mounting position are shown in dashed line. If each sensor is installed ideally at an interval of 120 degrees, the interval between the 60-degree angle signals generated from the output signals H1, H2, H3 of the Hall IC will be as ideal as 60 degrees. If the sensor mounting position has shifted, however, the interval becomes unequal and the position sensing of the motor is affected. In particular, when the motor is under field-weakening control, the motor efficiency deteriorates drastically. When the motor current is controlled with sine wave by using a Hall IC, the interval of the 60-degree angle signal is interpolated (control phase is obtained by time integration) by a microcomputer timer of PLL for use in the current control. Accordingly, because the sensed angle is obtained at a timing of the pulse edge of the Hall IC, the control phase φb becomes a broken line as shown by the sensed angle in FIG. 13. This means that the control phase error by time integration becomes greater as the motor rotating speed becomes slower, and this error can be a big factor for causing torque variation and uneven rotation in the lower speed rotation of the motor. If the phase difference estimating computation is performed at cycles smaller than the 60-degree angle signal like the phase difference estimating computation timing shown in the figure, the phase difference Δθb between the control phase φb and rotating angle θm of the motor can be corrected all the time because it is computed continually. In case Hall ICs are mounted like H1, H2, H3 in FIG. 11(2) and the angle sensing is performed at a timing of the pulse edge (edge of the 60-degree angle signal), the change in the magnetic flux of the same magnet is sensed alternately by each Hall IC. Consequently, it is preferable if the phase is corrected by using only the mounting phase difference Δθh of each sensor because the mounting phase difference can be corrected. In addition, the phase difference Δθh varies in patterns, where a pattern comprises the phase differences Δθh contained in one period of the sensor signal (which are equivalent to the six pulses of the 60-degree angle signal) (a pattern comprises three levels of the phase difference Δθh corresponding to the absolute angle from 0 to 360 degrees). This is an effect of the installation error of the permanent magnet, and there are 16 patterns for a motor with 16 pole pairs, each of which can also be stored for correction. In practice, however, the mounting phase difference of the three sensors are picked up from the patterns of the phase difference Δθh of the same magnet and corrected beforehand. In addition, the phase difference caused in one revolution of the motor rotor can be regarded as the phase difference resulting from the installation error of the permanent magnet, and it can be corrected by integration for averaging.

Figure 14:
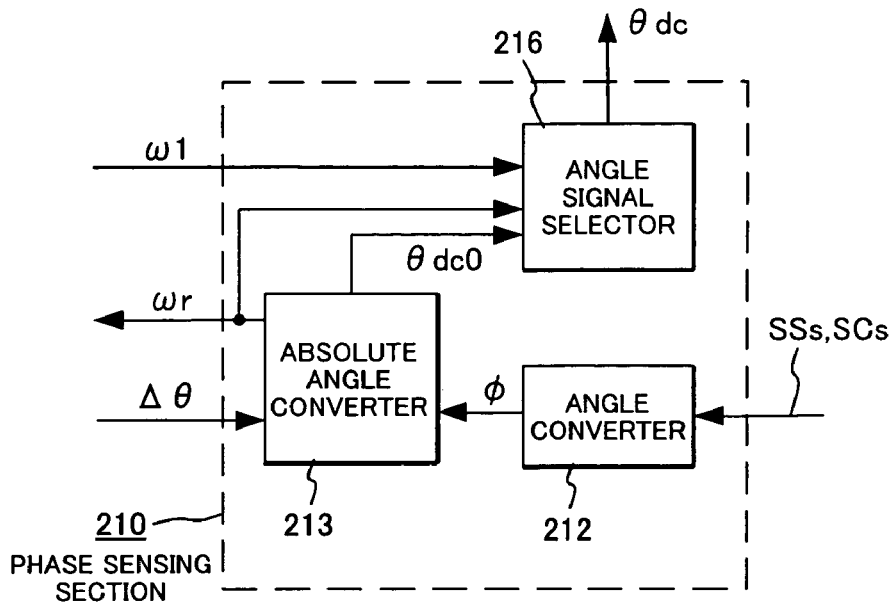
FIG. 14 is functional block diagram of a phase sensing section according to another embodiment of the present invention.

Next, the phase sensing section of the motor drive unit according to another embodiment of the present invention is described hereunder, using FIG. 14. FIG. 14 shows a modified position sensing section 209 of the motor drive unit, in which motor drive using sensor is switched to sensorless motor drive. This differs from FIG. 9 in it that there is provided an angle signal selector 216 that switches the motor drive to sensorless motor drive by using the inverter output frequency ω1 (frequency of the voltage applied to the motor) from the phase difference estimator 207 in the high-speed rotation of the motor which is affected by the frequency response of the rotary sensor. The absolute angle (control phase) θdc outputted by the absolute angle converter 213 in FIG. 9 is outputted from the angle signal selector 216 in FIG. 14. The angle signal selector 216 determines the speed from the angle speed ωr of the motor obtained from the signal of the rotary sensor or from the frequency ω1 of the voltage applied to the motor. In the low speed rotation, it selects the absolute angle θdc0, an output of the absolute angle converter 213 and output it as the control phase θdc. Next, when the speed reaches a specified high speed, the angle signal selector 216 outputs the rotor position (virtual rotor position) θdc on the control axis obtained by integration of the frequency ω1 of the voltage applied to the motor. Accordingly, sensorless motor drive applies in the high-speed rotation based only on the magnet pole position estimation without using the output from the rotary sensor. On this occasion, the phase difference estimator 207 employs the Formula (7) that neglects the angle speed ωr of the motor.

In case of the sensorless motor drive, from a fail-safe viewpoint, using the sensor-sensed angle to verify (monitor) the computation of the rotor position θdc will ensure higher reliability.

Accordingly, motor can be driven without lowering the motor efficiency even in a high-speed driving range where the sensitivity of the sensor-sensed angle becomes poor due to the frequency response of the rotary sensor.

Figure 15:
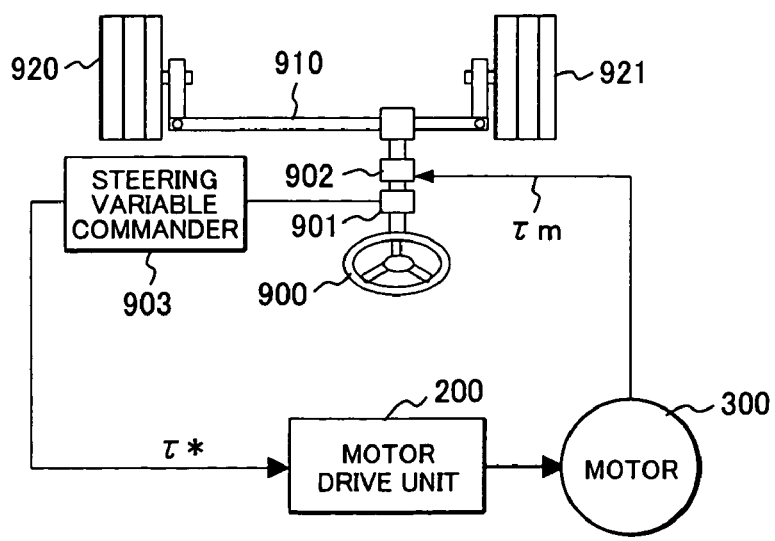
FIG. 15 is brief construction of an electric power steering unit to which the present invention is applied.

Next, an electric power steering unit according to another embodiment of the present invention is described hereunder, using FIG. 15. The construction of the electric power steering unit shown in FIG. 15 roughly consists of an electric actuator, steering 900, steering sensor 901 and steering variable commander 903. The electric actuator comprises a torque transmission 902, motor 300 and motor drive unit 200. This is a power steering unit with which the operating force of the steering 900 operated by the driver is assisted with torque by the electric actuator. The torque command τ* of the electric actuator is a steering assist torque command generated by the steering variable commander 903, and the steering force by the driver is reduced by adding the output from the electric actuator. The motor drive unit 800 receives the torque command τ* as an input command and controls the motor current by the torque constant of the drive motor and toque command τ* so that the motor toque follows the torque command value.

The motor output τm from the output shaft 360 directly coupled with the rotor of the motor 300 transmits torque to the wrack 910 of the steering unit via the torque transmission 902 using a change gear set such as worm wheel of planetary gear or a hydraulic unit. Consequently, the steering force (operating force) of the steering 900 by the driver is assisted by electrical force so as to operate the wheels 920, 921. Steering variable in the form of steering angle and steering toque is sensed by the steering sensor 901, incorporated in the steering for sensing the steering condition, degree of assist is determined in additional consideration of condition variables such as vehicle speed and road condition, and it is outputted from the steering variable commander 903 as the torque command τ*. In response to the torque command τ* required to an electric actuator that accelerates and decelerates very quickly, the motor drive unit of the present invention also enables high-efficiency motor drive by correcting the phase difference caused in the rotary sensor. Accordingly, even in the weak field range in the high-speed, high-torque operation of the electric actuator, motor drive without lowering the efficiency is available. In the low-speed operation, motor can be driven stably with little torque variation by reducing the sensor mounting error. In other words, on an electric power steering unit to which the motor drive unit of the invention is applied, high-toque and high-response power steering is available without ruining the operator's steering feeling.

Figure 16:
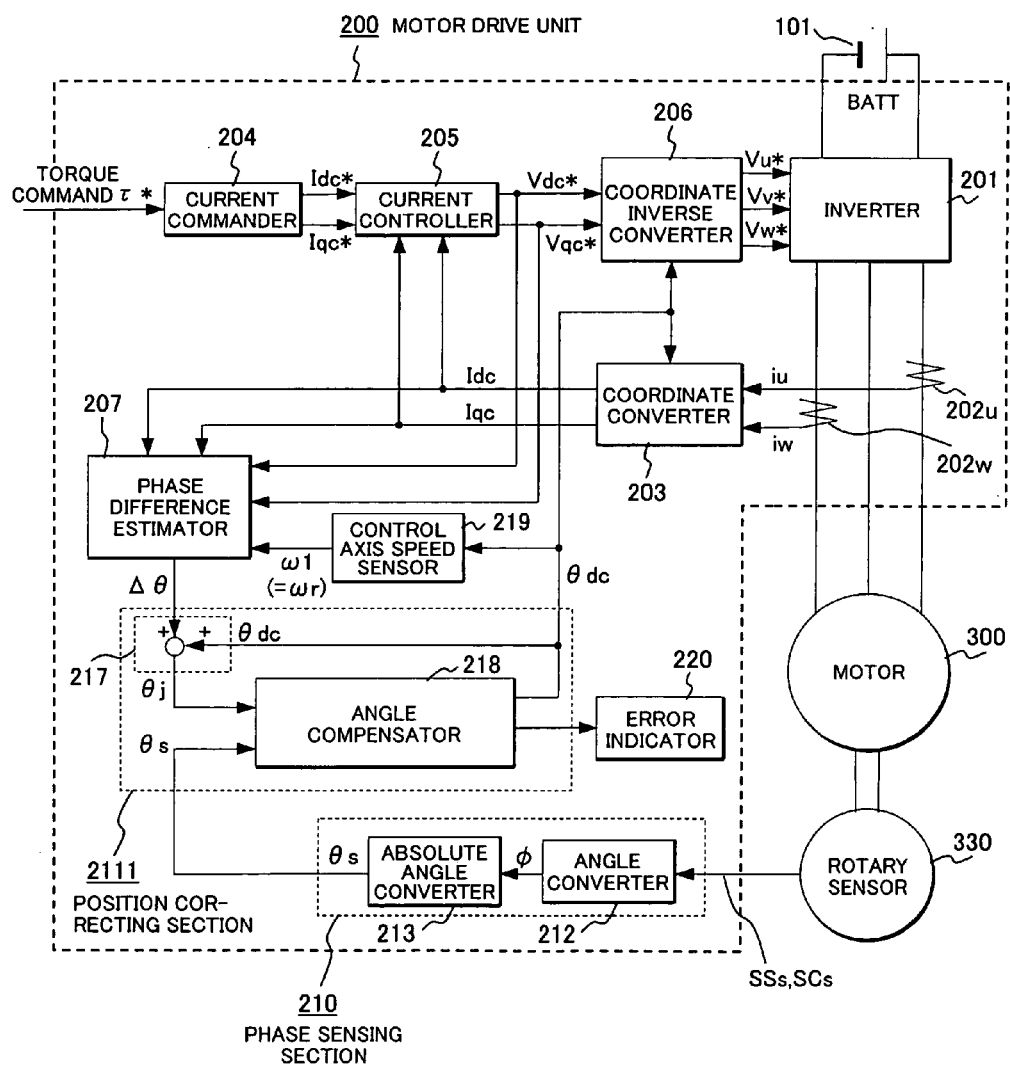
FIG. 16 is overall block diagram of a motor drive unit according to another embodiment of the present invention.
Figure 17:
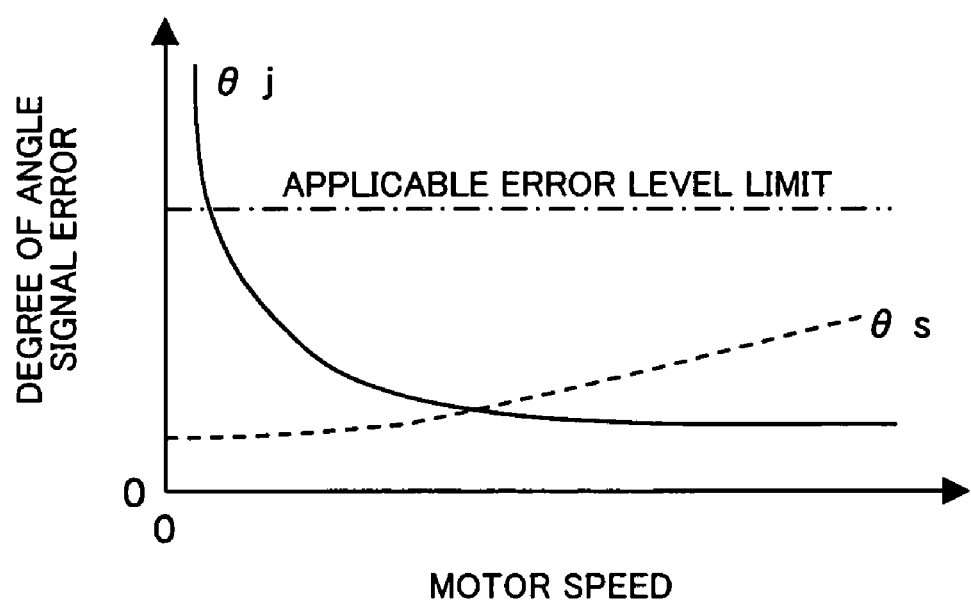
FIG. 17 is chart showing the relation between the degree of angle signal error and motor rotating speed.

Next, a synchronous motor drive unit according to another embodiment of the present invention is described hereunder, using FIGS. 16 and 17. The unit of this embodiment has a section for sensing multiple absolute angles each containing different sensing error, and is equipped with a position correcting section that minimizes the sensing error by using these multiple sensed signals. In this position correcting section, to be concrete, internal condition of the motor is estimated and filter gain is determined from the multiple absolute angle signals. Since the multiple angle signals in this construction are filtered as they are without classifying them by operating conditions such as the rotating speed of the motor, angle signals with low noise can be obtained. In addition, since the filter gain is dynamically determined by the angle compensator so that the error becomes minimum, accuracy of the angle signal obtained in the end by integrating the multiple sensed signals improves and high-efficiency motor control is realized in the whole driving range.

It is preferable that Karman filter is employed for the above angle compensator and the rotating speed of the motor rotor is estimated from the estimated internal condition in case one of the multiple angle signals fails.

It is also preferable that the unit is equipped with an error indicator (display) section that senses variation of the filter gain and notifies the user of occurrence of failure. With this construction, it becomes possible to drive the motor continuously even in case of sensor failure and, when applied to a hybrid car, it produces a merit as it enables to drive the car for emergency evacuation.

FIG. 16 is a block diagram of the synchronous motor drive according to another embodiment of the present invention and FIG. 17 is a chart showing the relation between the degree of the angle signal error and motor rotating speed. A big difference in FIG. 16 from FIG. 1 is that there are provided an angle compensator 218 to which two absolute angle signals θs and θj are inputted and an error indicator (display) 220 that notifies the failure of signals.

The phase sensing section 210 that constitutes the first absolute angle sensing section comprises an angle converter 212 and absolute angle converter 213, and outputs the first absolute angle θs based on the rotary sensor. On the other hand, the position corrector 2111 is equipped inside with the second absolute angle sensing section 217 that obtains the estimated absolute angle θj from the control phase θdc and output Δθ of the phase difference estimator 207. These (first) absolute angle θs based on the rotary sensor and estimated (second) absolute angle θj based on computation are inputted to the angle compensator 218 that minimizes the error in the control phase θdc based on the two angle signals.

The unit is so constructed as to utilize the control axis speed, that is, frequency ω1 of the voltage applied to the motor as a signal equivalent to the motor angle speed ωr, one of the input signals to the phase difference estimator 207. In other words, the control phase θdc is used as the input signal o the control axis speed sensor 219 for obtaining the control axis speed ω1 from the variation (integration) in the control period. However, it is possible to input the angle speed ωr obtained from the absolute angle θs to the phase difference estimator 207 instead of the above.

FIG. 17 shows the relation between the degree of the error in the estimated absolute angle θj and sensor-based absolute angle θs and the rotating speed of the motor. In the low speed range, the error in the estimated absolute angle θj is big because the counter electromotive voltage estimated by the phase difference estimator 207 is low, exceeding the applicable limit for motor drive. On the other hand, the error in the absolute angle θs based on the rotary sensor becomes bigger as the rotating speed of the motor increases because of the frequency response characteristic of the circuit. In view of the above, it may be an idea to utilize the estimated absolute angle θj or the sensor-based absolute angle θs by switching from one to the other. In case of switching the utilization, however, variation is caused in the angle signals near the switching point, which may possibly cause unstable rotation of the motor. In addition, the above in no way helps improve the error contained in each angle signal.

Accordingly, this embodiment is so constructed that switching the angles according to the rotation speed becomes no longer needed because of employing Karman filter for the angle compensator 218 and that the error in the control phase θdc is controlled to become minimum based on the two angle signals.

For the estimation of internal condition by the angle compensator 218, the Karman filter expressed by the Formula (8) is employed, where the internal condition of the motor is estimated from the angle signal (input signal) containing sensing error and the filter gain (including weighing) is dynamically determined by referring to the estimated internal condition. Since the Karman filter determines such feedback gain that minimizes the evaluation function for condition estimation, it can be employed as a dynamic filter that minimizes the error contained in the angle signal. Accordingly, the control phase θdc with reduced angle error can be obtained by utilizing the two angle signals (estimated absolute angle θj and sensor-based absolute angle θs).

$$\frac{d}{dt}Xh(t) = \{A - G(t)C\}Xh(t) + G(t)Y(t) + BU(t) \quad (8)$$

$$G(t) = P(t)C^T V^{-1}$$

In this expression, $Xh(t)$ is a condition estimating vector, $Y(t)$ is an output vector, $U(t)$ is a control vector, A is a system matrix, B is an input matrix, C is an output matrix, $G(t)$ is a filter gain matrix, P(t) is an estimated error covariance matrix, and V is a power spectrum of observed noise.

Prior to designing a Karman filter, data has been collected on a test unit for determining its initial value and the like. The initial value of the Karman filter and the like are recorded on a ROM and read out into a RAM during the motor drive operation, and they are updated online. Upon the shutdown of the system, they are escaped into the storage memory and read out again upon system booting.

Designing the Karman filter appropriately enables to minimize the time delay due to filtering to a very small level as compared to a low pass filter. Although the minimum time delay in digital processing by a microcomputer becomes longer than one cycle of the processing, it is possible to minimize the control delay to a negligible level by optimizing the cycle time.

According to this embodiment, minimizing the error by employing a Karman filter and using the multiple angle signals as explained above, high-efficiency motor drive becomes available in the whole driving range of the motor.

If one of the sensor fails, the error in the absolute angle θs becomes greater and may possibly exceed the applicable limit level at an instance of the motor rotation (within a range of the angle which the failed sensor is supposed to output under normal condition). However, because the angle compensator 218 and Karman filter are employed and signals are filtered for estimating the present condition based on past conditions, increase of the error in the output signal (control phase θdc) caused by the failure of a sensor can be minimized. In addition, the filter gain of the Karman filter varies so that the error becomes minimum within a range of the angle of the failed sensor. Since the variation of the filter gain shows a periodic bias as compared to normal variation, this shall be detected to determine position sensor failure. This is determined by the error indicator 220 and noticed to the user by an indicator lamp or buzzer.

According to this embodiment, it becomes possible to drive the motor continuously even in case of sensor failure. When applied to a hybrid car, driving for emergency evacuation becomes available, and the user having recognized the failure can drive the car immediately up to a repair shop.

What is claimed is:

1. A synchronous motor drive unit comprising a synchronous motor, an inverter for supplying variable-voltage and variable-frequency DC to the motor, a current sensor for sensing the current through the motor, a rotary sensor for sensing the rotating angle of the motor rotor, vector computing means for controlling the motor torque based on the current sensed by the current sensor and rotating angle signal sensed by the rotary sensor, and a PWM controller for controlling the inverter by PWM according to the computation result, a rotary sensor that generates a rotary output analog signal with multiple periods within one period of the electrical angle or absolute angle of the motor, means that energizes the motor at each position for a specified length of time upon its startup, by using multiple electrical angles of the motor corresponding to the multiple angles, including an absolute angle of magnetic pole position of the motor, sensed by the rotary sensor as the initial position of the motor, and an initial position determining means that determines the electrical angle at which the motor acceleration becomes maximum among the respective angles of energization as the absolute angle of the motor.

2. A synchronous motor drive unit according to claim 1, which is equipped with a phase difference estimating means that estimates the difference between the phase of the motor at the counter electromotive voltage and the control phase through computation using at least the parameters of the motor and output of the current sensor, and a position correcting means that corrects the sensed absolute angle with this phase difference and sets it as the phase of the control axis of the vector computing means.

3. A synchronous motor drive unit according to claim 1, which is equipped with a phase difference estimating means that estimates the difference between the phase of the motor at the counter electromotive voltage and the control phase through computation using at least the parameters of the motor and output of the current sensor, and a position correcting means that corrects the sensed absolute angle with this phase difference.

4. A synchronous motor drive unit according to claim 1, which is equipped with an angle signal selecting means that selects the output of the position correcting means as the angle signal for motor control when the angle speed of the motor is less than a specified angle speed and selects the rotor position on the control axis, obtained by integrating the frequency of the voltage applied to the motor, as the angle signal for motor control when the angle speed of the motor exceed the specified angle speed.

5. A synchronous motor drive unit according to claim 1, which is equipped with a speed sensing means that senses the rotating speed of the motor from the output signal of the rotary sensor and a phase difference estimating means that estimates the difference between the phase of the motor at the counter electromotive voltage and the control phase through computation using at least the rotating speed or output frequency of the inverter, parameters of the motor and output of the current sensor.

6. A synchronous motor drive unit according to claim 1, which is equipped with an angle converting means that obtains the sensor-sensed angle to the electrical angle of the motor from at least two or more analog rotary sensor signals, a speed sensing means that obtains the angle speed of the rotor based on the rotary sensor signals, a phase difference estimating means that estimates the difference between the phase of the motor at the counter electromotive voltage and the control phase through computation using at least the angle speed, parameters of the motor and motor current, a correction data storage means that stores the change in the phase difference at the sensor-sensed angle as the angle correction data, and an angle correcting means that corrects the energized phase of the motor current from the sensor-sensed angle and angle correction data.

7. A synchronous motor drive unit according to claim 1, wherein the vector computing means for controlling the motor torque is so constructed as to be inputted of torque command and the synchronous motor is equipped as a power load with an electric actuator having high acceleration and deceleration within a wide range of speed from the standing.

8. A synchronous motor drive unit according to claim 1, wherein the vector computing means for controlling the motor torque is so constructed as to be inputted of torque command from a vehicle controller and the synchronous motor is equipped as a power load with a vehicle driving at a wide range of speed from the standing up to high speed.

9. A synchronous motor drive unit comprising a synchronous motor, inverter for supplying variable-voltage & variable-frequency DC to the motor, current sensor for sensing the current through the motor, rotary sensor for sensing the rotating angle of the motor rotor, vector computing means for controlling the motor torque based on the current sensed by the current sensor and rotating angle signal sensed by the rotary sensor, and PWM controller for controlling the inverter by PWM according to the computation result;

equipped with an absolute angle converting means that obtains the absolute angle of the motor based on the output signal of the rotary sensor, a phase difference estimating means that estimates the difference between the phase of the motor at the counter electromotive voltage and the control phase through computation using at least the parameters of the motor and output of the current sensor, and a position correcting means that corrects the sensed absolute angle with this phase difference.

10. A synchronous motor drive unit according to claim 9, which is equipped with an angle signal selecting means that selects the output of the position correcting means as the angle signal for motor control when the angle speed of the motor is less than a specified angle speed and selects the rotor position on the control axis, obtained by integrating the frequency of the voltage applied to the motor, as the angle signal for motor control when the angle speed of the motor exceed the specified angle speed.

11. A synchronous motor drive unit according to claim 9, which is equipped with a speed sensing means that senses the rotating speed of the motor from the output signal of the rotary sensor, wherein the phase difference estimating means estimates the difference between the phase of the motor at the counter electromotive voltage and the control phase through computation using at least the rotating speed or output frequency of the inverter, parameters of the motor and output of the current sensor.

12. A synchronous motor drive unit according to claim 9, which is equipped with an angle converting means that obtains the sensor-sensed angle to the electrical angle of the motor from at least two or more analog rotary sensor signals, a speed sensing means that obtains the angle speed of the rotor based on the rotary sensor signals, a phase difference estimating means that estimates the difference between the phase of the motor at the counter electromotive voltage and the control phase through computation using at least the angle speed, parameters of the motor and motor current, a correction data storage means that stores the change in the phase difference at the rotary sensor-sensed angle as the angle correction data, and an angle correcting means that corrects the energized phase of the motor current from the rotary sensor-sensed angle and angle correction data.

13. A synchronous motor drive unit according to claim 2, wherein the position correcting means is equipped with the second absolute angle sensing section that obtains estimated absolute angle θj from the output θdc of the position correcting means and output Δθ of the phase difference estimating means, and an angle compensating means that estimates the internal condition of the motor, determines the filter gain dynamically, and estimates the control axis phase edc of the vector computing means, using the absolute angle from the first absolute angle sensing section based on the output of the rotary sensor and the output of the second absolute angle sensing section.

14. A synchronous motor drive unit according to claim 13, wherein the angle compensating means is equipped with a Kalman filter and an indicating section that operates when the filter gain of the Kalman filter varies in excess of a specified value.

15. A synchronous motor drive unit according to claim 9, wherein the vector computing means for controlling the motor torque is so constructed as to be inputted of torque command and the synchronous motor is equipped as a power load with an electric actuator having high acceleration and deceleration within a wide range of speed from the standing.

16. A synchronous motor drive unit according to claim 9, wherein the vector computing means for controlling the motor torque is so constructed as to be inputted of torque command from a vehicle controller and the synchronous motor is equipped as a power load with a vehicle driving at a wide range of speed from the standing up to high speed.

17. A method of driving a synchronous motor having an inverter for supplying variable-voltage and variable-frequency DC to the motor, a current sensor for sensing the current through the motor, a rotary sensor for sensing the rotating angle of the motor rotor, vector computing means for controlling the motor torque based on the current sensed by the current sensor and rotating angle signal sensed by the rotary sensor, and a PWM controller for controlling the inverter by PWM according to a computation result; comprising generating a rotary output analog signal with multiple periods by the rotary sensor within one period of the electrical angle or absolute angle of the motor, energizing the motor at each position for a specified length of time upon its startup by using multiple electrical angles of the motor corresponding to the multiple angles, including an absolute angle of a magnetic pole position of the motor, sensed by the rotary sensor as the initial position of the motor, and determining the electrical angle at which the motor acceleration becomes maximum among respective angles of energization as the absolute angle.

18. A method of driving a synchronous motor according to claim 17, further comprising estimating a difference between the phase of the motor at the counter electromotive voltage and the control phase through computation using at least the parameters of the motor and output of the current sensor, and correcting the sensed absolute angle with the phase difference and setting the phase as the phase of a control axis of the vector computing means.

19. A method of driving a synchronous motor according to claim 18, which further comprising selecting the correct absolute angle the angle signal for motor control when the angle speed of the motor is less than a specified angle speed, and a step for selecting the rotor position on the control axis, obtained by integrating the frequency of the voltage applied to the motor, as the angle signal for motor control when the angle speed of the motor exceeds the specified angle speed.

20. A method of driving synchronous a motor according to claim 17, further comprising obtaining sensor-sensed angle to the electrical angle of the motor from at least two or more analog rotary sensor signals, obtaining the angle speed of the rotor based on the rotary sensor signals, estimating the difference between the phase of the motor at the counter electromotive voltage and the control phase through computation using at least the angle speed, parameters of the motor and motor current, storing the change in the phase difference at the sensor-sensed angle as the angle correction data, and correcting the energized phase of the motor current from the sensor-sensed angle and angle correction data.

* * * * *